(12) United States Patent
Frantz et al.

(10) Patent No.: US 11,900,285 B1
(45) Date of Patent: Feb. 13, 2024

(54) SELECTED RESOURCE COMPUTATION FOR MOBILE EMPLOYEES

(71) Applicant: Avalara, Inc., Seattle, WA (US)

(72) Inventors: Henry H. Frantz, Bellevue, WA (US); Merianne K. White, Gig Harbor, WA (US); Nathan Harrenstein, Seattle, WA (US); Kevin Robert Halverson, Seattle, WA (US); Manuela Dorado Novoa, Bellevue, WA (US); Kohn Fletcher Ward, Seattle, WA (US); Gregory T. Kavounas, Bellevue, WA (US)

(73) Assignee: Avalara, Inc., Seattle, WA (US)

( * ) Notice: Subject to any disclaimer, the term of this patent is extended or adjusted under 35 U.S.C. 154(b) by 319 days.

(21) Appl. No.: 16/880,795

(22) Filed: May 21, 2020

Related U.S. Application Data

(60) Provisional application No. 62/916,605, filed on Oct. 17, 2019.

(51) Int. Cl.
| | |
|---|---|
| *G06Q 10/00* | (2023.01) |
| *G06Q 10/0631* | (2023.01) |
| *G06Q 10/1091* | (2023.01) |
| *G06F 9/54* | (2006.01) |

(Continued)

(52) U.S. Cl.
CPC ..... *G06Q 10/063114* (2013.01); *G06F 9/542* (2013.01); *G06F 16/909* (2019.01); *G06Q 10/1091* (2013.01); *G06Q 40/125* (2013.12)

(58) Field of Classification Search
USPC ................. 705/30, 7.11, 7.15, 7.12
See application file for complete search history.

(56) References Cited

U.S. PATENT DOCUMENTS

| | | | |
|---|---|---|---|
| 6,292,830 B1* | 9/2001 | Taylor | G06N 5/043 709/224 |
| 7,783,536 B2 | 8/2010 | William et al. | |
| 7,933,803 B1 | 4/2011 | Nadler et al. | |

(Continued)

OTHER PUBLICATIONS

Binder, A. (2019). Large-scale workforce relocations: What are the opportunities to influence travel behaviour towards sustainable modes? (Order No. 27673047). Available from ProQuest Dissertations and Theses Professional. (Year: 2019).*

(Continued)

*Primary Examiner* — Gurkanwaljit Singh
(74) *Attorney, Agent, or Firm* — Jeremiah J. Baunach; VLP Law Group LLP

(57) ABSTRACT

A specialized resource computation service engine electronically and automatically provides, in a timely and efficient manner, accurate and reliable tracking of mobile employees across domains and correctly apportions, calculates, and remits selected resources to those domains for employee compensation (including non-cash compensation) earned over a period of time according to the various different rules in various different domains. The system aggregates data indicative of different geographical locations and durations spent in the geographical locations by an employee over a time period, apportions respective amounts of time to each domain based on the aggregated data and computes, for the employee, a respective selected resource for each domain based on the respective amounts of time apportioned to each domain.

12 Claims, 12 Drawing Sheets

(51) Int. Cl.
*G06F 16/909* (2019.01)
*G06Q 40/12* (2023.01)

(56) References Cited

U.S. PATENT DOCUMENTS

| | | | | |
|---|---|---|---|---|
| 8,190,463 | B2 * | 5/2012 | Levine | G06Q 10/06 |
| | | | | 705/7.13 |
| 8,620,578 | B1 | 12/2013 | Brown et al. | |
| 8,725,407 | B2 | 5/2014 | Hurley et al. | |
| 9,760,915 | B2 | 9/2017 | Pavlou et al. | |
| 9,955,318 | B1 * | 4/2018 | Scheper | G01C 21/206 |
| 10,445,818 | B1 | 10/2019 | Chowdhary | |
| 10,769,611 | B2 | 9/2020 | McNeel | |
| 2002/0065700 | A1 * | 5/2002 | Powell | G06Q 10/06 |
| | | | | 705/7.14 |
| 2004/0006566 | A1 * | 1/2004 | Taylor | G06Q 10/10 |
| 2004/0039603 | A1 * | 2/2004 | Hanrahan | G06Q 10/10 |
| | | | | 705/2 |
| 2004/0267595 | A1 * | 12/2004 | Woodings | G06Q 10/105 |
| | | | | 705/7.14 |
| 2005/0015504 | A1 * | 1/2005 | Dorne | G06Q 10/04 |
| | | | | 709/229 |
| 2007/0136158 | A1 | 6/2007 | Rawlings et al. | |
| 2007/0136159 | A1 | 6/2007 | Rawlings et al. | |
| 2008/0109289 | A1 * | 5/2008 | Vivadelli | G06Q 50/163 |
| | | | | 705/314 |
| 2009/0150209 | A1 * | 6/2009 | Levine | G06Q 10/06 |
| | | | | 705/7.13 |
| 2010/0046553 | A1 * | 2/2010 | Daigle | G07F 17/32 |
| | | | | 370/474 |
| 2011/0320231 | A1 * | 12/2011 | Podgurny | G06Q 50/28 |
| | | | | 705/7.13 |
| 2013/0339969 | A1 * | 12/2013 | Koski | G06Q 10/10 |
| | | | | 718/103 |
| 2014/0122143 | A1 * | 5/2014 | Fletcher | G06Q 10/0631 |
| | | | | 705/7.14 |
| 2015/0066557 | A1 * | 3/2015 | Lichti | G06Q 10/06311 |
| | | | | 705/34 |
| 2015/0324823 | A1 * | 11/2015 | Unser | G06Q 30/02 |
| | | | | 705/7.34 |
| 2016/0042470 | A1 * | 2/2016 | Shaaban | G06Q 40/12 |
| | | | | 705/30 |
| 2016/0132816 | A1 * | 5/2016 | Lush | G06Q 10/063112 |
| | | | | 705/7.14 |
| 2016/0140589 | A1 * | 5/2016 | Deshpande | G06Q 30/0201 |
| | | | | 705/7.34 |
| 2016/0255139 | A1 * | 9/2016 | Rathod | H04L 67/42 |
| | | | | 709/203 |
| 2017/0116552 | A1 * | 4/2017 | Deodhar | G06Q 10/0639 |
| 2017/0337497 | A1 * | 11/2017 | Birukov | G06Q 10/06313 |
| 2018/0103116 | A1 * | 4/2018 | Raghunathan | H04L 67/32 |
| 2021/0150630 | A1 * | 5/2021 | Davis, III | G06N 3/004 |

OTHER PUBLICATIONS

Collings, David G., Hugh Scullion, and Michael J. Morley. "Changing patterns of global staffing in the multinational enterprise: Challenges to the conventional expatriate assignment and emerging alternatives." Journal of World Business 42.2 (2007): 198-213. (Year: 2007).*

* cited by examiner

SELECTED RESOURCE COMPUTATION FOR MOBILE EMPLOYEES

The present patent application claims priority to U.S. Provisional Patent Application No. 62/916,605, filed Oct. 17, 2019.

SUMMARY

Entities often have to determine resources for multiple domains based on respective amounts of time apportioned to each domain, whether it be businesses computing utilization of cloud computing resource based on respective amounts of time apportioned to multiple different cloud computing resources, or computing different state income tax amounts for an employee who works in multiple different states in a year. Businesses generally collect information relating to their operations by using enterprise resource planning ("ERP") software applications and/or accounting applications. ERP applications manage information relating to a business's activities, such as human resources, employee benefits and compensation, employee payroll, employee tracking, information technology (IT), finance, sales, resource management, production, inventory management, delivery, billing, and so on. Accounting applications manage a business's accounting information, such as purchase orders, sales invoices, payroll, expenses, compensation, accounts payable, accounts receivable, and so on. ERP applications, accounting applications, ecommerce applications and other conventionally used applications fail to, in a timely and efficient manner, provide accurate and reliable tracking of mobile employees across domains and fail to correctly apportion, calculate, and remit selected resources to those domains for employee compensation (including non-cash compensation) earned over a period of time according to the various different rules in various different domains.

To solve the above technical problems, disclosed herein is method including aggregating, by a computer system, data indicative of different geographical locations and durations spent in the geographical locations by at least one employee over a time period; apportioning, by the computer system, respective amounts of time to each domain of a plurality of domains based on the aggregated data indicative of different geographical locations and durations spent in the geographical locations by the at least one employee over the time period; and computing, by the computer system, for the at least one employee, a respective selected resource for one or more domains of the plurality of domains based on the respective amounts of time apportioned to each domain of the plurality of domains.

The method may further include generating, by the computer system, a timeline of geographical locations of the at least one employee over the time period based on the aggregated data, and in which the apportioning respective amounts of time to each domain of a plurality of domains may be based on the generated timeline.

The timeline may be generated by superimposing travel records of the at least one employee on work attendance records of the at least one employee.

The method may further include: receiving, by the computer system, one or more corrections to the generated timeline of locations of the at least one employee; and revising, by the computer system, the timeline based on the one or more corrections, and in which the computing the respective selected resource may be based on the revised timeline.

The one or more corrections may be received from the at least one employee.

The method may further include: sending, by the computer system, one or more queries requesting confirmation or corrections to the generated timeline; and in which the one or more corrections may be received in response to the one or more queries.

The one or more queries may be sent to the at least one employee. The timeline may include durations of time the at least one employee spent in each of the geographical locations and the apportioning respective amounts of time to each domain of a plurality of domains may include: mapping each of the geographical locations to a corresponding domain of the plurality of domains; assessing which of the plurality of domains are applicable to the durations of time the at least one employee spent in each of the geographical locations over the time period based on the mapping of each of the geographical locations to a corresponding domain of the plurality of domains; and apportioning respective amounts of time for the at least one employee to each domain of the plurality of domains based on the assessment of which of the plurality of domains are applicable to the durations of time the at least one employee spent in each of the geographical locations over the time period. The computing, for the at least one employee, the respective selected resource may include: receiving a value indicative of an amount of a resource attributable to the at least one employee that is subject to the computation of the respective selected resource; apportioning a respective amount of the resource attributable to the at least one employee to each domain of the plurality of domains based on the respective amounts of time for the at least one employee apportioned to each domain of the plurality of domains; and computing the respective selected resource for one or more domains of the plurality of domains based on the respective apportioned amount of the resource attributable to the at least one employee to each domain of the plurality of domains.

The method may further include: electronically communicating, by the computer system, for each domain of the plurality of domains, the respective apportioned amount of the resource attributable to the at least one employee to an entity associated with the domain.

The method may further include: electronically withholding, by the computer system, for each domain of the one or more domains, an amount of a resource for the at least one employee based on the computed respective selected resource for the domain.

The computing the respective selected resource for one or more domains of the plurality of domains may include, for each domain of the one or more domains of the plurality of domains, using a rate specific to the domain to compute the respective selected resource for the domain.

The method may further include: before computing the respective selected resource for the one or more domains of the plurality of domains, for each domain of the one or more domains of the plurality of domains: looking up, by the computer system, stored rules regarding computing selected resources for the domain; and determining, by the computer system, the rate specific to the domain based on the looked-up stored rules.

Also, disclosed herein is a system including at least one processor; and a memory coupled to the at least one processor, the memory storing instructions that, when executed by the at least one processor, cause the system to perform operations including: aggregating data indicative of different geographical locations and durations spent in the geographical locations by at least one employee over a time period;

apportioning respective amounts of time to each domain of a plurality of domains based on the aggregated data indicative of different geographical locations and durations spent in the geographical locations by the at least one employee over the time period; and computing for the at least one employee, a respective selected resource for one or more domains of the plurality of domains based on the respective amounts of time apportioned to each domain of the plurality of domains.

The aggregating the data may include aggregating data indicative of different geographical locations and durations spent in the geographical locations by a plurality of employees over a time period; the apportioning respective amounts of time may include apportioning respective amounts of time to each domain of the plurality of domains based on the aggregated data indicative of different geographical locations and durations spent in the geographical locations by the plurality of employees over the time period; and the computing the respective selected resource may include computing, for each employee of the plurality of employees, a respective selected resource for multiple domains of the plurality of domains based on the respective amounts of time apportioned to each domain of the plurality of domains.

The instructions, when executed by the at least one processor, may further cause the system to perform operations including: generating a timeline of locations of the at least one employee over the time period based on the aggregated data, and in which the apportioning respective amounts of time to each domain of a plurality of domains may be based on the generated timeline. The timeline may be generated by superimposing travel records of the at least one employee on work attendance records of the at least one employee.

The instructions, when executed by the at least one processor, may further cause the system to perform operations including: receiving one or more corrections to the generated timeline of locations of the at least one employee; and revising the timeline based on the one or more corrections, and in which the computing the respective selected resource may be based on the revised timeline. The one or more corrections may be received from the at least one employee.

The instructions, when executed by the at least one processor, may further cause the system to perform operations including: sending one or more queries requesting confirmation or corrections to the generated timeline; and in which the one or more corrections may be received in response to the one or more queries. The one or more queries may be sent to the at least one employee. The timeline may include durations of time the at least one employee spent in each of the geographical locations and the apportioning respective amounts of time to each domain of a plurality of domains may include: mapping each of the geographical locations to a corresponding domain of the plurality of domains; assessing which of the plurality of domains are applicable to the durations of time the at least one employee spent in each of the geographical locations over the time period based on the mapping of each of the geographical locations to a corresponding domain of the plurality of domains; and apportioning respective amounts of time for the at least one employee to each domain of the plurality of domains based on the assessment of which of the plurality of domains are applicable to the durations of time the at least one employee spent in each of the geographical locations over the time period.

The computing, for the at least one employee, the respective selected resource may include: receiving a value indicative of an amount of a resource attributable to the at least one employee that is subject to the computation of the respective selected resource; apportioning a respective amount of the resource attributable to the at least one employee to each domain of the plurality of domains based on the respective apportioned amounts of time for the at least one employee to each domain of the plurality of domains; and computing the respective selected resource for one or more domains of the plurality of domains based on the respective apportioned amount of the resource attributable to the at least one employee to each domain of the plurality of domains.

The instructions, when executed by the at least one processor, may further cause the system to perform operations including: electronically communicating for each domain of the plurality of domains, the respective apportioned amount of the resource attributable to the at least one employee to an entity associated with the domain.

The instructions, when executed by the at least one processor, may further cause the system to perform operations including: electronically withholding for each domain of the one or more domains, an amount of a resource for the at least one employee based on the computed respective selected resource for the domain. The computing the respective selected resource for one or more domains of the plurality of domains may include, for each domain of the one or more domains of the plurality of domains, using a rate specific to the domain to compute the respective selected resource for the domain.

The instructions, when executed by the at least one processor, may further cause the system to perform operations including: before computing the respective selected resource for the one or more domains of the plurality of domains, for each domain of the one or more domains of the plurality of domains: looking up stored rules regarding computing selected resources for the domain; and determining the rate specific to the domain based on the looked-up stored rules.

Also disclosed herein is a non-transitory computer-readable storage medium having computer-executable instructions stored thereon that, when executed by at least one processor, cause the at least one processor to perform operations including aggregating data indicative of different geographical locations and durations spent in the geographical locations by at least one employee over a time period; apportioning respective amounts of time to each domain of a plurality of domains based on the aggregated data indicative of different geographical locations and durations spent in the geographical locations by the at least one employee over the time period; and computing for the at least one employee, a respective selected resource for one or more domains of the plurality of domains based on the respective amounts of time apportioned to each domain of the plurality of domains.

The aggregating the data may include aggregating data indicative of different geographical locations and durations spent in the geographical locations by a plurality of employees over a time period; the apportioning respective amounts of time may include apportioning respective amounts of time to each domain of the plurality of domains based on the aggregated data indicative of different geographical locations and durations spent in the geographical locations by the plurality of employees over the time period; and the computing the respective selected resource may include computing, for each employee of the plurality of employees, a respective selected resource for multiple domains of the plurality of domains based on the respective amounts of time apportioned to each domain of the plurality of domains.

The instructions, when executed by the at least one processor, may further cause the processor to perform operations including: generating a timeline of locations of the at least one employee over the time period based on the aggregated data, and in which the apportioning respective amounts of time to each domain of a plurality of domains may be based on the generated timeline. The timeline may be generated by superimposing travel records of the at least one employee on work attendance records of the at least one employee.

The instructions, when executed by the at least one processor, may further cause the processor to perform operations including: receiving one or more corrections to the generated timeline of locations of the at least one employee; and revising the timeline based on the one or more corrections, and in which the computing the respective selected resource may be based on the revised timeline. The one or more corrections may be received from the at least one employee.

The instructions, when executed by the at least one processor, may further cause the processor to perform operations including: sending one or more queries requesting confirmation or corrections to the generated timeline; and in which the one or more corrections may be received in response to the one or more queries. The one or more queries may be sent to the at least one employee. The timeline may include durations of time the at least one employee spent in each of the geographical locations and the apportioning respective amounts of time to each domain of a plurality of domains may include: mapping each of the geographical locations to a corresponding domain of the plurality of domains; assessing which of the plurality of domains are applicable to the durations of time the at least one employee spent in each of the geographical locations over the time period based on the mapping of each of the geographical locations to a corresponding domain of the plurality of domains; and apportioning respective amounts of time for the at least one employee to each domain of the plurality of domains based on the assessment of which of the plurality of domains are applicable to the durations of time the at least one employee spent in each of the geographical locations over the time period.

The computing, for the at least one employee, the respective selected resource may include: receiving a value indicative of an amount of a resource attributable to the at least one employee that is subject to the computation of the respective selected resource; apportioning a respective amount of the resource attributable to the at least one employee to each domain of the plurality of domains based on the respective amounts of time for the at least one employee apportioned to each domain of the plurality of domains; and computing the respective selected resource for one or more domains of the plurality of domains based on the respective apportioned amount of the resource attributable to the at least one employee to each domain of the plurality of domains.

The instructions, when executed by the at least one processor, may further cause the processor to perform operations including: electronically communicating for each domain of the plurality of domains, the respective apportioned amount of the resource attributable to the at least one employee to an entity associated with the domain.

The instructions, when executed by the at least one processor, may further cause the processor to perform operations including: electronically withholding, for each domain of the one or more domains, an amount of a resource for the at least one employee based on the computed respective selected resource for the domain. The computing the respective selected resource for one or more domains of the plurality of domains may include, for each domain of the one or more domains of the plurality of domains, using a rate specific to the domain to compute the respective selected resource for the domain.

The instructions, when executed by the at least one processor, may further cause the processor to perform operations including: before computing the respective selected resource for the one or more domains of the plurality of domains, for each domain of the one or more domains of the plurality of domains: looking up stored rules regarding computing selected resources for the domain; and determining the rate specific to the domain based on the looked-up stored rules.

BRIEF DESCRIPTION OF THE SEVERAL VIEWS OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, that embodiments of the inventive subject matter may be practiced without these specific details. In general, well-known structures and methods associated with underlying technology have not been shown or described in detail to avoid unnecessarily obscuring descriptions of the preferred embodiments.

Providing, in a timely and efficient manner, accurate and reliable automated tracking of mobile employees across different domains and correctly apportioning, calculating, and remitting selected resources to those domains for employee compensation (including non-cash compensation) earned over a period of time according to the various different rules in various different domains, presents a technical problem for current ERP applications. Additionally, computing, for an employee, a respective selected resource for a plurality of domains based on the respective amounts of time of the employee apportioned to each domain in conjunction with communicating such information in a timely and efficient manner over computer networks and in a way that integrates well into existing technical environments presents an additional technical problem. The present disclosure provides systems, computer-readable media, and methods that solve this technical problem by increasing the speed, efficiency and accuracy of such specialized software platforms and computer networks, thus improving the technology of ERP software applications and accounting applications. Therefore, the systems and methods described herein for selected resource computation for mobile employees and other techniques described herein improve the functioning of computer or other hardware, such as by reducing the processing, storage, and/or data transmission resources needed to perform various tasks, thereby enabling the tasks to be performed by less capable, capacious, and/or expensive hardware devices, enabling the tasks to be performed with less latency and/or preserving more of the conserved resources for use in performing other tasks or additional instances of the same task.

Figure 1:
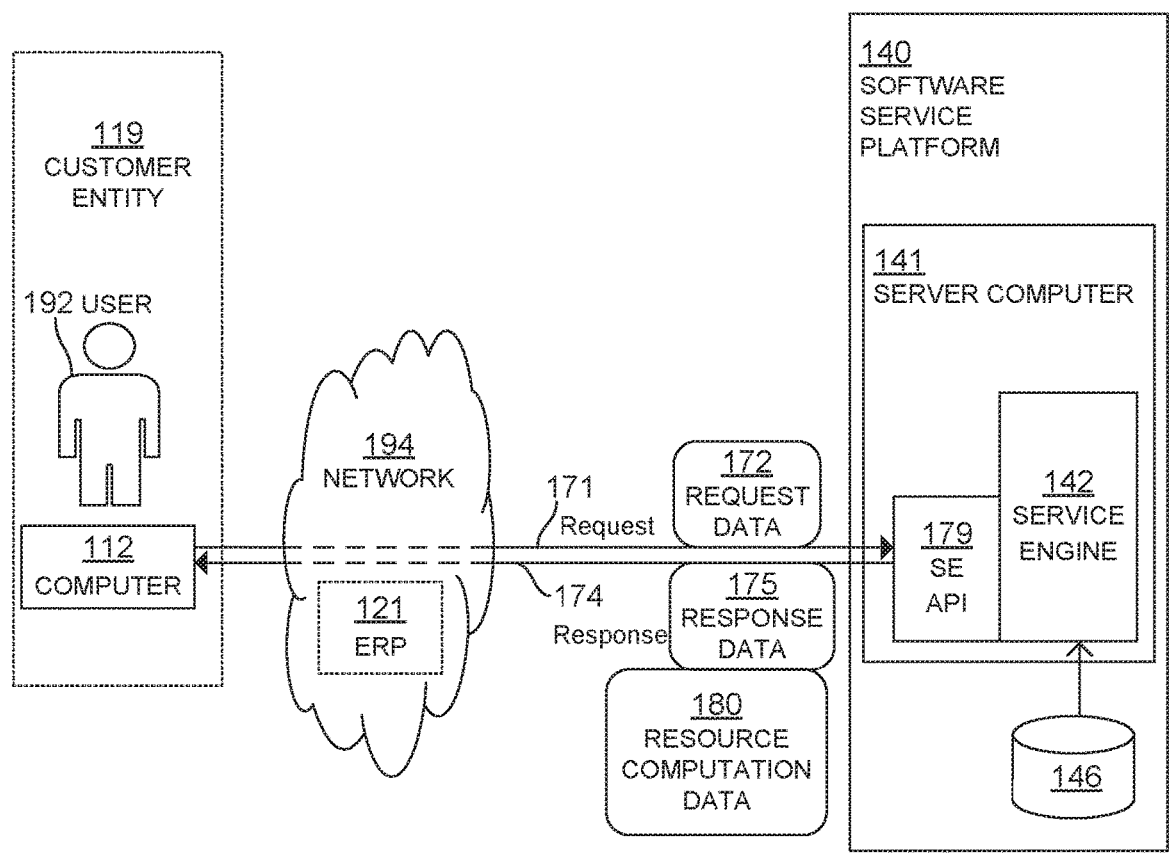
FIG. 1 is a block diagram showing an example configuration of a system for selected resource computation for mobile employees according to various embodiments of the present disclosure where the output resource determinations are sent to the entity providing the inputs.

FIG. 1 is a block diagram showing an example configuration of a system 100 for selected resource computation for mobile employees according to various embodiments of the present disclosure. In one embodiment, the configuration of FIG. 1 is for where the output resource determinations are sent to the entity providing the inputs about the employees. That entity may then, on its own, generate the exact outputs needed and send them to ultimately intended recipients, of the type shown in FIG. 4.

A sample customer entity 119 includes a computer 112, and a user 192 who may use computer 112. Both could be located within a physical site of the customer entity 119, but that is not necessary. More details about computer 112 are provided with reference to FIG. 2.

In this example, a network 194 is a communications network. Network 194 can be any type of network, such as a local area network (LAN), a metropolitan area network (MAN), a wide area network (WAN), or the internet. In some embodiments, network 194 is considered to be the cloud. An Enterprise Resource Planning (ERP) system 121 may also be within network 194, if it is the cloud, or accessible by computer 112 via network 194.

In this example, a software service platform 140 is implemented by a server computer 141 and a database 146 storing data. Software service platform 140 can be implemented in the cloud, on the premises of a provider, in a combination of the two, and so on. Of course, additional server computers may be used for a single service, for example, in a peer-to-peer configuration, with the operations of the service distributed among them. The server computers can be located at a single geographic location or be distributed across multiple locations. Similarly, additional databases may be used for the service, and so on.

Server computer 141 is configured, by software, to implement a new service engine 142. Service engine 142 is configured to perform a predefined service. The service can be a computation, a search, a verification, a registration, a payment, a notification, generation of specialized information, and so on. According to various embodiments of the present disclosure, the service may be determining, generating and/or computing, for an employee of customer entity 119 or for customer entity 119 itself, information about a respective selected resource for one or more domains of a plurality of domains based on respective amounts of time apportioned to each domain of the plurality of domains. In some embodiments, the service engine 142 may aggregate data indicative of different geographical locations and durations spent in the geographical locations by the employee of customer entity 119 and apportion respective amounts of time to each domain of the plurality of domains based on the aggregated data indicative of the different geographical locations and durations spent in each over the time period. The resource computation data 180 may be or include the computed selected resource and/or include such information about the selected resource.

In the context of FIG. 1, user 192 desires the service, and may even pay for it. User 192 uses computer 112 to access network 194 and, from network 194, to access software service platform 140. It will be appreciated that, in some contexts, service engine 142 performs cloud computing and is provided as software as a service (SaaS). Moreover, computer 112 can be viewed as a client computer from the perspective of software service platform 140.

The service of service engine 142 can be performed responsive to service engine 142 being properly invoked. While being performed, the service may use data from database 146.

Server computer 141 further hosts a service engine (SE) Application Programming Interface (API) 179. In some embodiments, SE API 179 is configured to invoke service engine 142 to perform its service, when properly requested. In various embodiments, service engine 142 may perform its service without invocation by SE API 179. For example, service engine 142 may also or instead automatically invoke itself to perform the applicable service periodically and/or in response to one or more various conditions being satisfied, including, but not limited to, one or more of: a detected change or update to stored rules about resource computation for one or more domains; a detected change or update to information associated with the customer entity 119 that may result in a change in the resource computation for a certain domain and/or certain employee; one or more thresholds being met, within a predetermined threshold of being met, or being exceeded regarding information associated with resource computation for a certain domain and/or certain employee; conditions indicated by stored preferences of customer entity 119, etc.

SE API 179 is configured to receive a request 171, which is shown as an arrow. Request 171 may be transmitted via network 194. Request 171 may have been ultimately caused to be generated by computer 112, for example, as operated by user 192. In some embodiments, request 171 is transmitted via network 194 directly to SE API 179. In other embodiments, computer 112 causes ERP system 121 to transmit request 171. In yet other embodiments, ERP system 121 originates request 171 on behalf of customer entity 119.

Request 171 may also include associated request data 172. When SE API 179 receives request 171 with its request data 172, it invokes service engine 142. When thus invoked, service engine 142 may perform its service using request data 172. In response, SE API 179 can be configured to transmit a response 174, also shown as an arrow. Response 174 may include response data 175 that arises out of the service, such as a computed result, a confirmation, and so on. Response 174 can be transmitted back to the sender of request 171, or as otherwise directed.

In some embodiments, the request 171 may be automatically generated and transmitted, such as by the ERP system 121 and/or computer 112 in response to one or more various conditions being satisfied, including, but not limited to, one or more of: a detected change or update to stored rules about resource computation for one or more domains; a detected change or update to information associated with the customer entity 119 that may result in a change in the resource computation for a certain domain and/or certain employee; one or more thresholds being met, within a predetermined threshold of being met or being exceeded, regarding information associated with resource computation for a certain domain and/or certain employee; conditions indicated by stored preferences of customer entity 119, etc.

In response to such a request being automatically generated, or in response to the service engine 142 invoking itself, the service engine 142 may generate and/or transmit resource computation data 180. For example, resource computation data 180 may be or include, for an employee of customer entity 119 or for customer entity 119 itself, a computed respective selected resource for one or more domains of a plurality of domains based on respective amounts of time apportioned to each domain of the plurality of domains; aggregated data indicative of different geographical locations and durations spent in the geographical locations by the employee of customer entity 119; respective amounts of time apportioned to each domain of the plurality of domains based on the aggregated data indicative of the different geographical locations and durations spent in each over the time period by the employee; a respective computed selected resource and/or information about the computed selected resource for each employee of a plurality of employees of customer entity 119; and information about reporting and remitting the respective computed selected resource for each domain; prompts or queries for acquiring and/or verifying the locations and durations spent in each location over the time period by each employee of the plurality of employees of customer entity 119, etc.

Also, in response to such a request being automatically generated, or in response to the service engine 142 invoking itself, or based on some other condition being met, the service engine 142 may report and/or remit the respective computed selected resource to each respective domain or to a system or entity associated with each respective domain. In various embodiments, the customer entity 119 may be or include a system or entity associated with a particular domain and the resource computation data 180 may include information reporting and/or remitting the respective computed selected resource for that domain.

In some embodiments, the resource computation data 180 may be used to update information regarding an account associated with the customer entity 119. The account associated with the customer entity 119 may be accessible by the customer entity 119 via a client computing device, for example, the computer 112, wherein the updated information is for display on a user interface associated with the account. Such a user interface may, in various embodiments, be a user interface of the server computer 141, computer 112, and/or a computer in ERP system 121, and so on. Furthermore, the account associated with the customer entity 119 may be managed, stored and/or accessible by the server computer 141, computer 112, and/or a computer in ERP system 121, and so on.

Computer program code for carrying out operations for aspects of the present disclosure may be written in any combination of one or more programming languages, including an object-oriented programming language such as Java, Smalltalk or the like, and/or conventional procedural programming languages, such as the "C" programming language or similar programming languages such as C++, C sharp, etc. Portions of the program code may be executed on server computer 141, computer 112, a computer in ERP system 121, and so on.

Additional details about the components of FIG. 1 are provided near the end of this description, for not interrupting the flow of this description at this stage.

Figure 2:
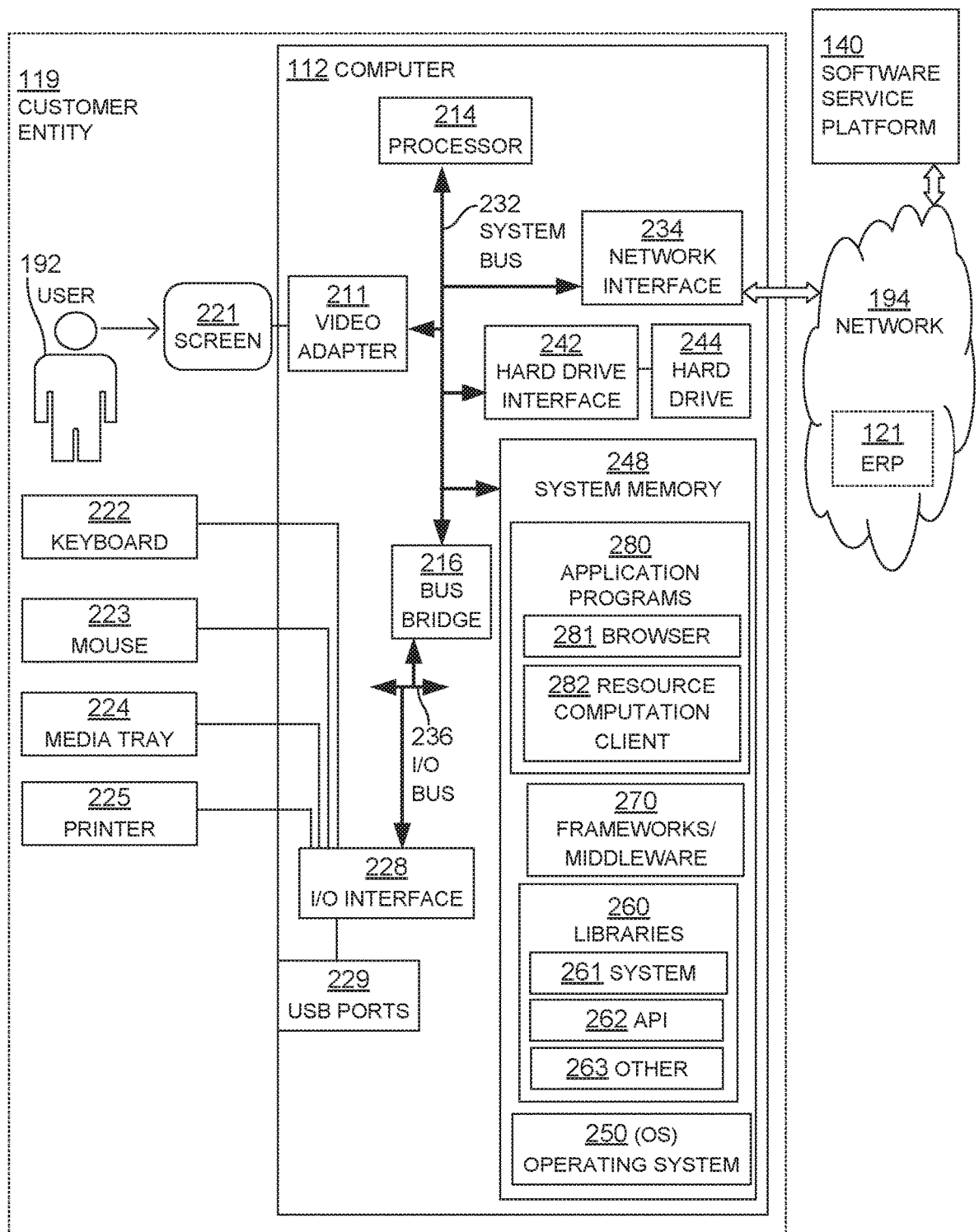
FIG. 2 is a block diagram showing more details of a computer of an example customer entity of FIG. 1, with reference to the communication network and the software service platform, according to various embodiments of the present disclosure.

FIG. 2 is a block diagram showing more details of a computer 112 of an example customer entity 119 of FIG. 1, with reference to the communication network 194 and the software service platform 140, according to various embodiments of the present disclosure.

FIG. 2 shows customer entity 119 of FIG. 1, along with more sample details for computer 112. Computer 112 may be a desktop computer, a laptop computer, a tablet computer, a mobile phone, and so on. In various embodiments, some or all of the components of computer 112 may comprise one or more systems of the software service platform 140 and/or server computer 141 and perform the functionality of the software service platform 140 and/or server computer 141 accordingly.

Computer 112 includes a processor 214. Computer 112 also includes a system bus 232 that is coupled to processor 214. System bus 232 can be used by processor 214 to control and/or communicate with other components of computer 112.

Computer 112 additionally includes a network interface 234 that is coupled to system bus 232. Network interface 234 can be implemented by a hardware network interface, such as a network interface card (NIC), wireless communication components, cellular communication components, Near Field Communication (NFC) components, Bluetooth® components such as Bluetooth® Low Energy, Wi-Fi® components, etc. Of course, such a hardware network interface may have its own software, and so on. Network interface 234 can access network 194.

Also shown is a resource computation client 282 residing in system memory 248, which may comprise computer-executable instructions executed by processor 214 to invoke or otherwise obtain services of the software service platform 140 provided by the service engine 142 running on server computer 141 of the software service platform 140. For example, the resource computation client 282 may obtain and/or invoke the software service platform 140 to generate and/or transmit resource computation data 180. In some embodiments, the resource computation client 282 may generate a user interface for and/or provide access to an account associated with the customer entity 119 through which the resource computation data 180 for the customer entity 119 may be accessible by the customer entity 119 via the computer 112. For example, information about or including, for an employee of customer entity 119 or for customer entity 119 itself, a computed respective selected resource for one or more domains of a plurality of domains based on respective amounts of time apportioned to each domain of the plurality of domains may be displayed via the resource computation client 282 on a user interface associated with the account and/or the resource computation client 282. Also, information about or including reporting and remitting the respective computed selected resource for each domain; prompts or queries for acquiring and/or verifying the different locations and durations spent in each location over the time period by each employee of the plurality of employees of customer entity 119, etc., may be displayed via the resource computation client 282 on a user interface associated with the account and/or the resource computation client 282. The resource computation client 282 may, in various embodiments, be part of or integrated with the browser 281. In other embodiments, the browser 281 may be or perform the operations of the resource computation client 282, for example, when the software service platform 140 provides web-based services.

In some embodiments, the resource computation client 282 may communicate and/or obtain services of ERP applications (e.g., ERP system 121), accounting applications, human resource (HR) applications, finance applications, information technology applications, ecommerce applications and/or other applications remote from or resident on the computer 112. For example, the resource computation client 282 may cause ERP system 121 to transmit a request or other information to the software service platform 140 that invokes services of the software service platform 140 to be provided to the resource computation client 282 and/or ERP system 121. For example, such information may include, but is not limited to: location data indicative of the geographical locations of one or more employees over a time period; durations of time one or more employees spent in each of the geographical locations over the time period; activities of one or more employees spent in each of the geographical locations over the time period; information from accounting applications, human resource applications, finance applications, information technology applications, ecommerce applications and/or other applications remote from or resident on the computer 112. Such information may also or instead include information indicative of one or more various conditions being satisfied, including, but not limited to, one or more of: a detected change or update to stored rules about resource computation for one or more domains; a detected change or update to information associated with the customer entity 119 that may result in a change in the resource computation for a certain domain and/or certain employee; one or more thresholds being met, within a predetermined threshold of being met, or being exceeded regarding information associated with resource computation for a certain domain and/or certain employee; conditions indicated by stored preferences of customer entity 119, etc.

Additional details about FIG. 2 are provided near the end of this description, for not interrupting the flow of this description at this stage.

Use Case Example

Businesses often have to compute an amount of a resource associated with performing various business functions. One example use case that utilizes embodiments described herein may be for purposes of computing amounts of state income tax to be reported remitted, withheld, and/or paid to each state for a mobile employee that travels and works in, or earns income associated with, various different states throughout a particular time period (e.g., a calendar year or tax year). In one example, a mobile employee may travel to various different states to work on different projects, work with different customers or clients, and/or due to job transfers, etc. In another example, an employee may travel to various different states to work for multiple different employers (e.g., when changing jobs) or may be self-employed and travel to different states to work. Such may also apply to other types of jurisdictions that have particular tax rules, including, but not limited to, cities, municipalities, counties, countries, etc.

Figure 3:
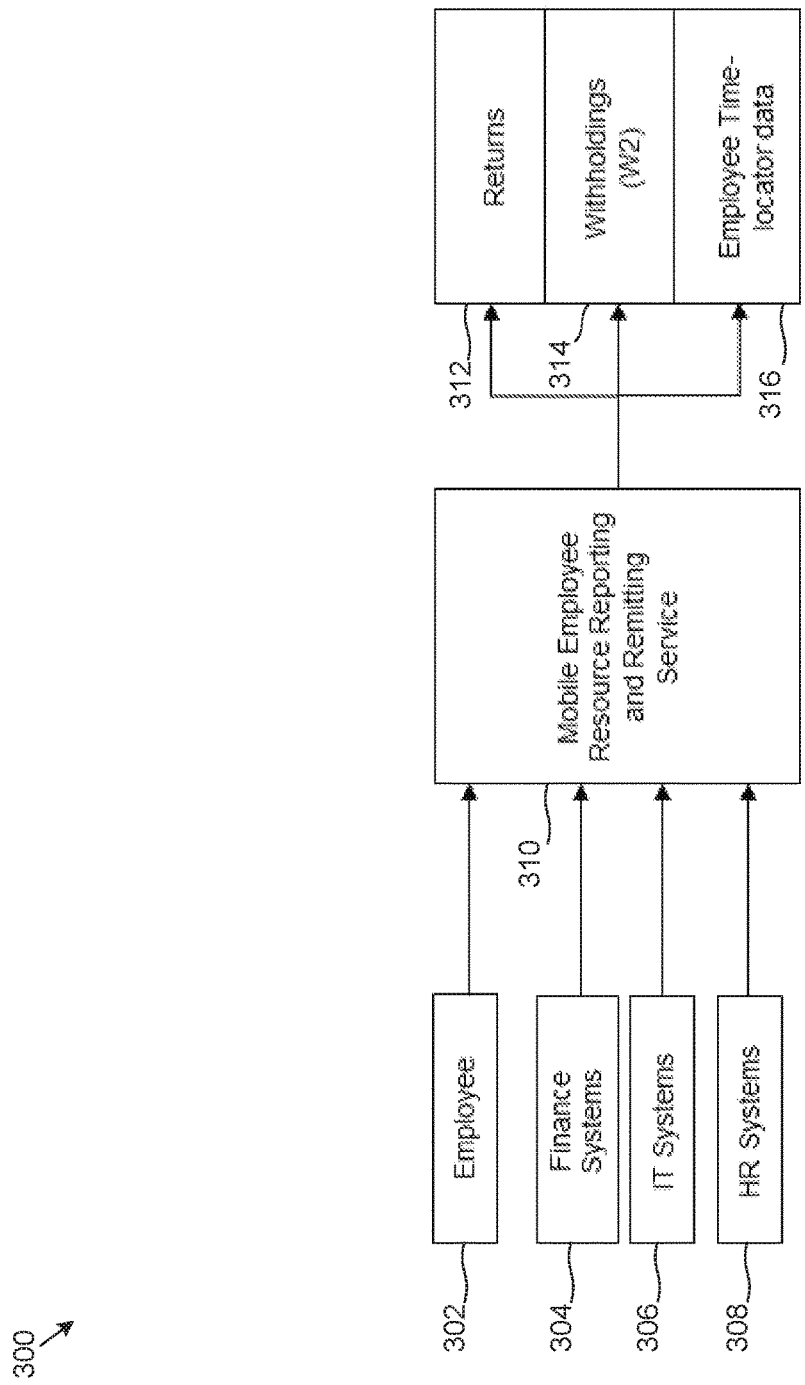
FIG. 3 is a block diagram showing an example software architecture including a mobile employee resource reporting service that improves the technology of software services, according to various embodiments of the present disclosure.

FIG. 3 is a block diagram showing an example software architecture 300 including a mobile employee resource reporting and remitting service 310 that improves the technology of software services, according to various embodiments of the present disclosure.

In one embodiment, a software-implemented mobile employee resource reporting and remitting service 310 comprises or is part of the software service platform 140 of FIG. 1 and is configured to provide resource-related services. For example, these services may include computing, reporting and remitting the respective computed state income tax, if any, for each state in which an employee was located or worked during the calendar year. The mobile employee resource reporting and remitting service 310 may electronically and automatically perform such services for a plurality of employers. For example, for each employee of the employer, the mobile employee resource reporting and remitting service 310 may determine employee time-locator data 316 indicative of which states the employee was located or worked in during the calendar year and when. The mobile employee resource reporting and remitting service 310 may compute the state income tax due to each state in which the employee was located or worked based on such data, determine applicable state income tax withholdings 314 from the employee's paycheck and prepare and/or file tax returns 312 accordingly. Such output may be communicated via the mobile employee resource reporting and remitting service 310 to each applicable state, the employer and/or the respective employee. For example, such communication may be over network 194 and may comprise or be part of resource computation data 180 of FIG. 1.

The mobile employee resource reporting and remitting service 310 may perform such services and output the corresponding data based on various indicators received as input from one or more sources. For example, the mobile employee resource reporting and remitting service 310 may access or be accessible to computing systems or devices of the employee 302, finance systems 304, IT systems 306 and/or HR systems 308 of the employer. In some embodiments, the computing systems or devices of the employee 302, finance systems 304, IT systems 306 and/or HR systems 308 may be included in or be accessible via the ERP system 121 of FIG. 1 and FIG. 2, which communicates over network 194 with the software service platform 140 that may include the mobile employee resource reporting and remitting service 310 or components thereof.

Figure 4:
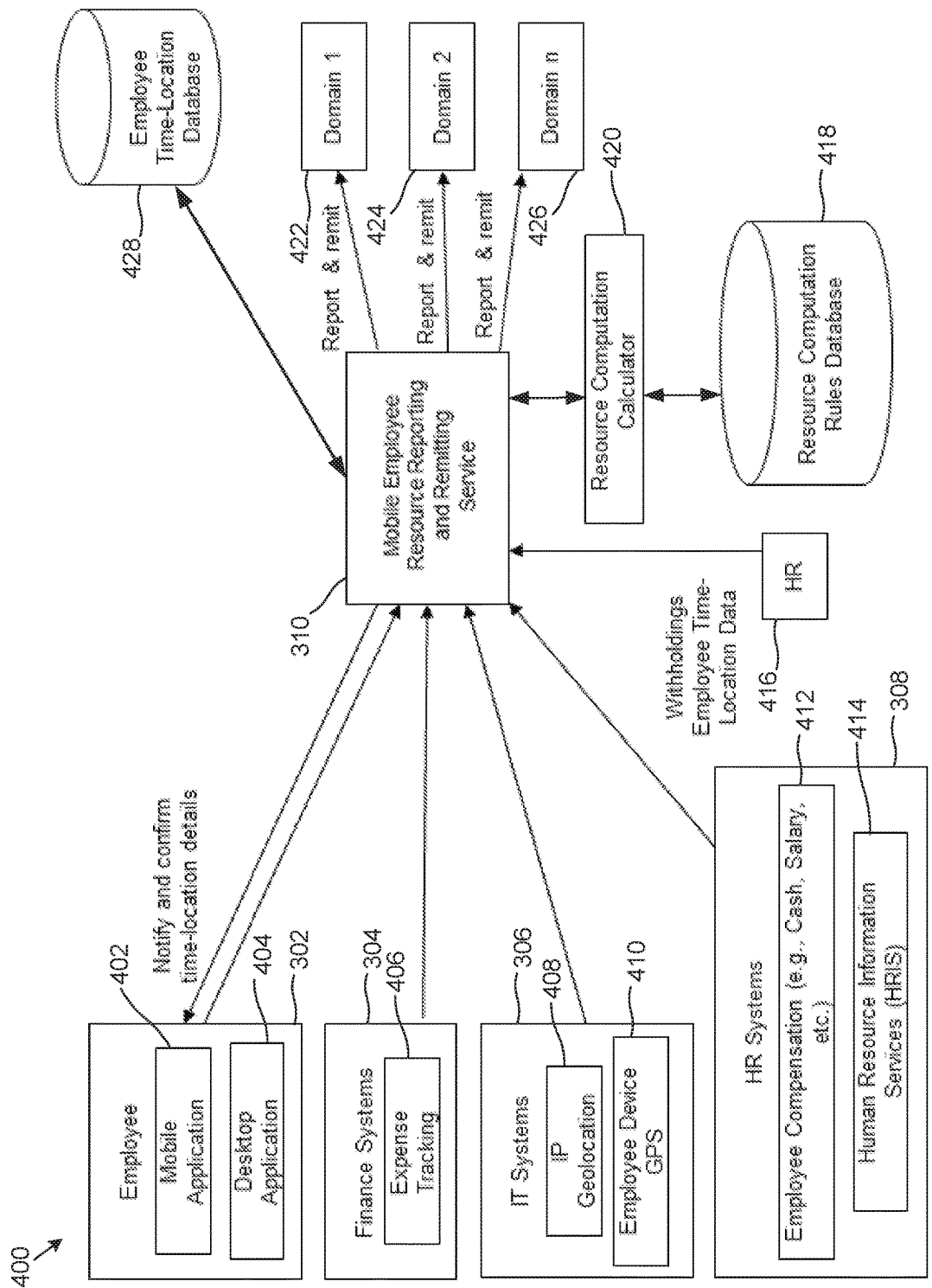
FIG. 4 is a block diagram showing a lower level example software architecture including a mobile employee resource reporting service that improves the technology of software services, according to various embodiments of the present disclosure, where the resource determinations and other outputs are sent to ultimately intended recipients on behalf of the entity providing the inputs.

FIG. 4 is a block diagram showing a lower level example software architecture 400 including a mobile employee resource reporting and remitting service 310 that improves the technology of software services, according to various embodiments of the present disclosure. Further, the architecture 400 is for an arrangement where the resource determinations and other outputs are sent to ultimately intended recipients on behalf of the entity providing the inputs.

FIG. 4 repeats elements of FIG. 3 in more detail, namely the mobile employee resource reporting and remitting service 310 in electronic communication with the computing systems or devices of the employee 302, finance systems 304, IT systems 306 and/or HR systems 308. In one embodiment, the computing systems or devices of the employee 302 may include desktop computers, mobile devices, tablet computers, etc., that each have a respective application that enables the employee to electronically communicate and/or verify details of the user's location at various times. For example, the mobile device of the user may run a mobile application 402 and a desktop, laptop or notebook computer of the user may run a desktop application 404. The employee or other user may use the mobile application 402 and/or the desktop application 404 to electronically communicate, track and/or verify time-location information including details of their location at various times. The mobile application 402 and/or the desktop application 404 may autonomously communicate details of the user's location at various times, for example, based on global positioning systems (GPS) or triangulation of the employee mobile device and/or geolocation data based on an Internet Protocol (IP) address of the employee's desktop, laptop or notebook computer. In some embodiments, such IP geolocation data 408 and/or employee device GPS data 410 may be obtained via various IT systems 306, such as IT systems of the employer that communicate with, provide access to, have access to, and/or control the various devices of the employee for work-related activities.

In some embodiments, the mobile application 402 and/or the desktop application 404 may be an application specialized for the user. e.g. the employee, to log, record and/or update time-location details which may include, but are not limited to: indications of the various geographical locations of the employee, durations spent at each location, arrival and departure dates and times for the locations, a timeline of the various locations, travel details and work performed at or associated with each location. The mobile employee resource reporting and remitting service 310 may automatically receive such information by the mobile application 402 and/or the desktop application 404 pushing such data as it is updated to the mobile employee resource reporting and remitting service 310 or by the mobile employee resource reporting and remitting service 310 periodically requesting such updated information from the mobile application 402 and/or the desktop application 404. In some embodiments, the mobile application 402 and/or the desktop application 404 may include, be integrated with, comprise, be part of or extract some or all of such time-location details from one or more calendar, time management, communication, project management, digital assistant, expense reimbursement, travel and/or travel expense applications running on the various devices of the employee.

In embodiments, a time-location database 428 is also implemented. For example, the time-location database 428 may include, comprise or be part of the database 146 of FIG. 1. Where implemented, the time-location database 428 may act as a repository of some or all of such learned time-location data about the employees. For implementing, it may be advantageous to have the employee time-location database 428 be accessible to the mobile employee resource reporting and remitting service 310 from the employee time-location database 428. In other use cases, the time-location database 428 may even hold, tentatively, employee data that is learned, even directly, from the devices of employee 302, finance systems 304, IT systems 306, HR systems 308, other HR 416; and the tentatively-held data may be confirmed later, as described later in this document.

In other embodiments, the mobile employee resource reporting and remitting service 310 may notify the employee of preliminary or tentative time-location data indicating a current or past location of the employee. The mobile employee resource reporting and remitting service 310 may query or prompt the employee to verify the accuracy or supplement such location information via the mobile application 402 and/or the desktop application 404. For example, such preliminary or tentative time-location data indicating a current or past location of the employee may be obtained by the mobile employee resource reporting and remitting service 310 via the IP geolocation data 408 and/or employee device GPS data 410.

Finance systems 304 associated with the employer and/or employee may automatically provide data to the mobile employee resource reporting and remitting service 310 that is useful for the mobile employee resource reporting and remitting service 310 in determining, even if indirectly, when and where the employee was a particular time for purposes of computing the state income tax due to each state in which the employee was located or worked, determine applicable state income tax withholdings and prepare and/or file tax returns 312 accordingly. For example, the finance systems 304 may include one or more expense tracking systems 406 including data indicative of various business expenses the employee incurred while in or associated with various locations the employee was working, as well as dates and times when such expenses were incurred. Based on the dates and times when such expenses were incurred, the mobile employee resource reporting and remitting service 310 may determine that the employee was present at the location associated with the particular expense at or near the time the particular expense occurred or was recorded. In some embodiments, such expense tracking systems 406 may include, communicate with, or be part of expense reimbursement, credit card, debit card, and/or other expense account systems of business or employer-provided credit cards, debit cards, and/or other expense accounts used for such expenses. In some embodiments, the expense tracking systems 406 may include, be integrated with, comprise, be part of or extract some or all of such expense data from one or more calendar, time management, communication, project management, digital assistant, expense reimbursement, travel and/or travel expense applications running on the various devices of the employee.

Various other current and historical data regarding the employee may be obtained and/or received by the mobile employee resource reporting and remitting service 310 from various systems associated with the employer and/or employee. For example, HR systems 308 may include an employee compensation subsystem 412 and/or one or more human resource information services (HRIS) subsystems 414 that provide, for each employee, information about current and/or historical data regarding one or more of: compensation, benefits, payroll data, salary, hourly compensation, overtime, bonuses, non-cash compensation, equity awards, credits, points, reimbursements, shares of stock and stock options, commissions, tips, health benefits, daycare benefits, paid time off, insurance benefits, income tax withholdings, information that is or that is to be provided on a tax return, earnings reports, information that is or that is to be provided on an employee W2 statement, audit information, accounting information, etc. Also, a separate or different HR system 416 may provide withholdings information and employee time-location data.

Also shown is a resource computation calculator 420 which accesses a resource computation rules database 418 to obtain resource computation rules for various domains. For example, the resource computation rules database 418 may store income tax rules for various states indicating, for each state, under what particular circumstances and conditions a person is subject to income tax for the state. Many of such rules depend on one or more of the status, intentions and/or current and historical information regarding the person including, but not limited to: the current and historical physical locations of the person; durations and/or frequency of visits in the state; total days living or visiting the state and/or overnight stays in the state within a particular time period (e.g., calendar or tax year); locations of residence(s) and/or abodes of the person; voter registration of the person, driver's license or other state-issued identification of the person; locations of employer(s) of the person; employment status of the person; purposes of visiting the state; sources of income of the person; residency or legal status of the person; jurisdiction over the person; and other associations of the person with the state. Some or all of such information regarding the status, intentions and/or current and historical information regarding the person may be received or obtained by the mobile employee resource reporting and remitting service 310 from one or more of the computing systems or devices of the employee 302, finance systems 304, IT systems 306, HR systems 308, other HR system 416, and the employee time-location database 428. Each state may have different rules for when a person is subject to income tax for the state and the resource computation rules database 418 may be updated by the mobile employee resource reporting and remitting service 310 and/or other sources as such rules change, including automatically being updated upon detection of such rules changing. In various embodiments, the resource computation rules database 418 may include, comprise or be part of the database 146 of FIG. 1.

The resource computation calculator 420 may use the information received or obtained by the mobile employee resource reporting and remitting service 310, and optionally accumulated in the employee time-location database 428 to compute the state income tax due from the employee to each state in which the employee was located or worked. Based on the state income tax due to each state in which the employee was located or worked, the mobile employee resource reporting and remitting service 310 may report and remit to each state (e.g., Domain 1 422, Domain 2 424, . . . , Domain n 426) the respective computed state income tax due, if any. For example, the mobile employee resource reporting and remitting service 310 may determine the applicable state income tax withholdings from the employee's paycheck, withhold such amount from the employee's paycheck, report to the state such state income tax due or withheld from the employee and may prepare and/or file tax returns accordingly.

Figure 5:
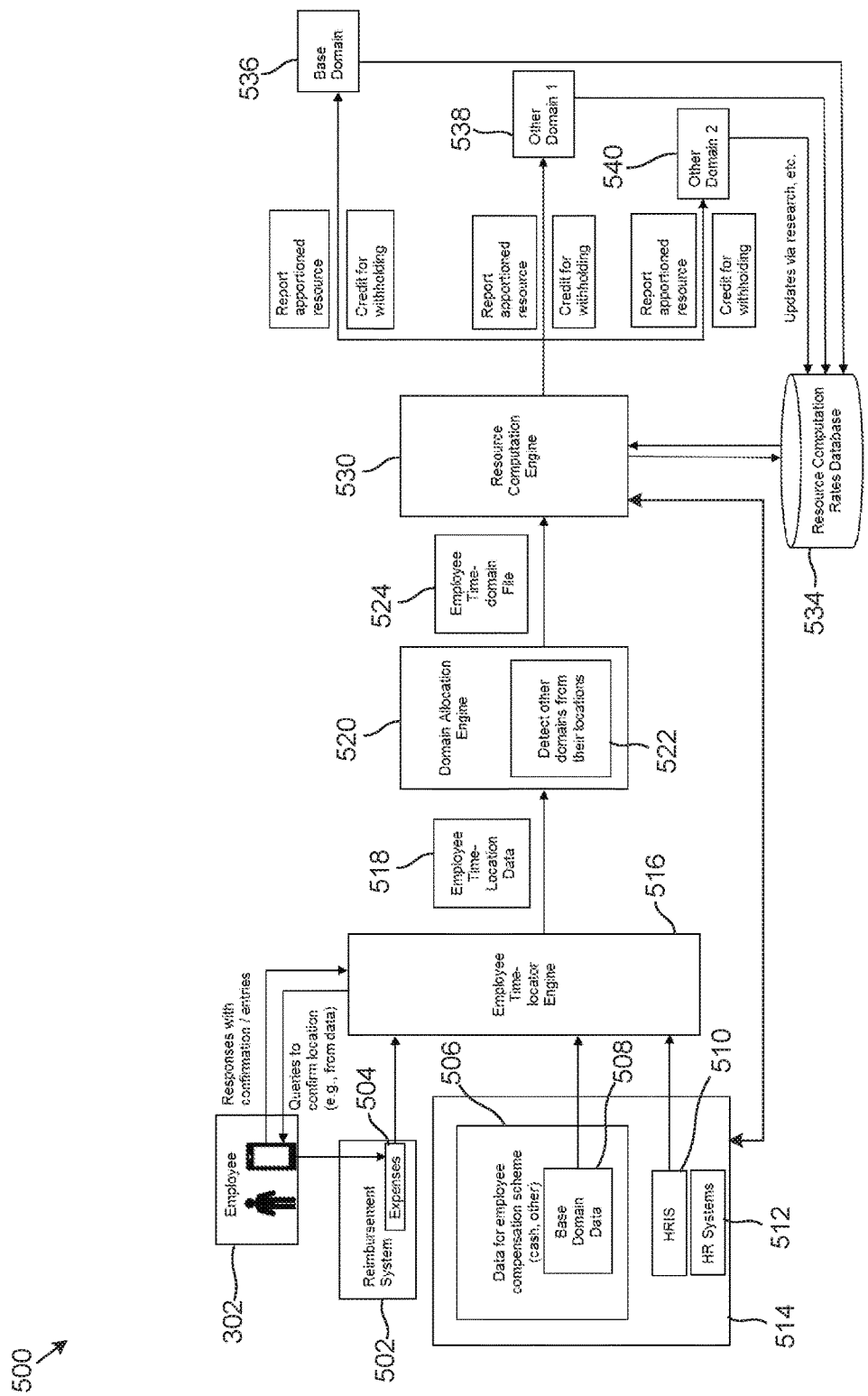
FIG. 5 is a block diagram showing an example system including components of a mobile employee resource reporting service interacting with external systems to improve the technology of software services, according to various embodiments of the present disclosure.

FIG. 5 is a block diagram showing an example system 500 including components of a mobile employee resource reporting and remitting service, such as, for example, mobile employee resource reporting and remitting service 310 of FIG. 4, interacting with external systems to improve the technology of software services, according to various embodiments of the present disclosure.

Shown is an employee time-locator engine 516 that aggregates employee location-related data from various systems, including the expense reimbursement system 502 (which provides expense data 504), employment information systems 514, including HRIS 510, HR systems 512 and others. The employee time-locator engine 516 may aggregate the data indicative of different geographical locations and durations spent in the different geographical locations by the employee over a time period.

The employment information systems 514 may generate, store and/or provide data indicative of the compensation scheme for the employee, including, for example, compensation that may be subject to state income tax of different states under particular circumstances. Some or all of such data indicative of the compensation scheme may be generated, stored and/or provided by the HRIS 510, HR systems 512 and/or other systems. For example, the HRIS 510 may be integrated with, comprise, or be part of the HRIS 414 of FIG. 4 and the HR systems 512 may be integrated with, comprise, or be part of the other separate or different HR system 416 of FIG. 4. The data indicative of the compensation scheme may include data representing various types of compensation and the history of, or various different payment, realization, maturity and/or vesting of, different types of compensation for the employee. The employment information systems 514 may also may generate, store and/or provide data indicative of various future dates, conditions or triggers for such different payment, realization, maturity and/or vesting of different types of compensation for the employee. For example, the various different types of compensation that may be subject to state income tax under particular circumstances includes, but is not limited to: cash compensation, salary, hourly compensation, overtime compensation, non-cash compensation, credits, points, benefits, salary, bonuses, reimbursements, equity awards, shares of stock and stock options, commissions, tips, health benefits, daycare benefits, transportation benefits, paid time off, insurance benefits, etc. In various embodiments, some or all of the employment information systems 514 and/or the expense reimbursement system 502 may include, be integrated with, comprise, or be part of the finance systems 304, IT systems 306, HR systems 308 and or HR system 416 of FIG. 4.

The data indicative of the compensation scheme for the employee may also include base domain (e.g., state or jurisdiction) data 508 indicative of which domain is considered the employee's base domain for income tax purposes and information on how this affects the compensation or resource computation for the domain (e.g., income tax computation for the state). For example, the base domain data may indicate the employee's permanent residence and that the tax computation would be according to the state of the employee's permanent residence, or may indicate that the employee is traveling to many different states or other geographic locations for work, and thus trigger a custom taxation calculation based on actual location worked. The data indicative of the compensation scheme for the employee may be communicated to the employee time-locator engine 516 and also to the domain allocation engine 520 and/or resource computation engine 530, such as via the employee time-locator engine 516. In some embodiments, the data indicative of the compensation scheme for the employee may be communicated directly to the domain allocation engine 520 and/or resource computation engine 530.

The employee time-locator engine 516 generates a tentative timeline of the employee's location. In some embodiments, this may be generated for a particular time period (e.g., one or more calendar years or tax years). The employee time-locator engine 516 sends queries to the employee, requesting that the employee confirm their tentative timeline, or correct it. For example, the employee time-locator engine 516 sends prompts or queries to one or more applications running on one or more devices of the employee (e.g., mobile application 402 and/or the desktop application 404 of FIG. 4) such as via one or more application programming interfaces (APIs) to acquire and/or verify the locations and durations spent in each location over the time period indicated in the generated tentative timeline. The employee's responses to the prompts or queries may be electronically and automatically fed back into the employee time-locator engine 516, which then creates the employee time-location data 518. The employee time-location data 518 can be stored in a database, such as employee time-location database 428 of FIG. 4. The employee time-location data 518 can be in a file, especially as a useful way of depicting it.

The employee time-locator engine 516 then sends the employee time-location data 518 to a domain allocation engine 520. The sending is shown by an arrow, and the data 518 is shown above the arrow. In an example embodiment, the domain allocation engine 520 may assess which tax jurisdictions (e.g., which states) are applicable to the employee's location data over a given period of time. The domain allocation engine 520 may detect 522 from the employee time-location data 518 which domains (e.g., tax jurisdictions or states) the employee has visited based on the locations indicated in the employee time-location data 518. In one embodiment, the domain allocation engine 520 may apportion respective amounts of time to each domain (e.g., tax jurisdictions or state) of a plurality of domains based on the aggregated data, including the employee time-location data 518, indicative of different geographical locations and durations spent in the geographical locations by the employee over the time period. The domain allocation engine 520 may then send such data included in an employee time-domain file 524 to a resource computation engine 530.

For example, the domain allocation engine 520 may determine that on a particular date and time, an expense for the employee was recorded via the expense reimbursement system 502 for a hotel in Green Bay, Wisconsin and automatically determine that the employee visited Wisconsin in response to reading such data from the employee time-location data 518. As another example, the employee time-location data 518 may include GPS, triangulation and/or IP data, signals or machine language (or even encrypted data) associated with a device of the employee such that only a computer may interpret and determine the location of the device represented by such data. The domain allocation engine 520 then electronically reads, interprets and processes such data and determines the location of the device of the employee indicated by such data. The domain allocation engine 520 then electronically detects which state the particular location is in and determines that the employee was in that particular state at a date and time associated with the GPS, triangulation and/or IP data, signals or machine language. The result of such determinations may be recorded in the employee time-domain file 524.

After the domains (e.g., states or tax jurisdictions) have been determined by the domain allocation engine 520, the domain allocation engine 520 then sends, to the resource computation engine 530, information from the employee time-location data 518 related to the amount of time spent in each state or tax jurisdiction. The sending is shown by an arrow, and the employee time-domain file 524 is shown above the arrow, as an example. This sent information may be included in the employee time-domain file 524. The resource computation engine 530 receives, ultimately directly or indirectly from the employment information systems 514, an input of a taxable amount on which to apply the tax calculations (e.g., from the data indicative of the employee compensation scheme 506).

The resource computation engine 530 then computes, for the employee, a respective income tax amount for one or more states of a plurality of states based on the respective amounts of time apportioned to each state as indicated in the employee time-domain file 524 received from the domain allocation engine 520. In one embodiment, the resource computation engine 530 performs this computation by using the information in the employee time-domain file 524 to apply the correct tax rates to the compensation of the employee that is to be taxed for those states or jurisdictions to which time was apportioned. In some embodiments, the resource computation engine 530 computes the income tax for each state proportionally based on the respective amount of time of the employee that was apportioned to each state by the domain allocation engine 520 based on or adjusted by various different tax rates and rules for each state. In some embodiments, the resource computation engine 530 determines that some or all states to which time was apportioned by the domain allocation engine 520 would not be due any income tax based on various tax rules for such states. The resource computation engine 530 may apply any tax credit rules against the tax assessment in order to prevent double taxation in multiple states or jurisdictions.

Some or all of the correct tax rates and tax rules used in the computation of the amount, if any, of income tax (including tax credits) for each state based on the employee time-domain file 524 and employee compensation scheme data 506 are stored in the resource computation rates database 534, which can be akin to the resource computation rules database 418. The resource computation rates database 534 may be updated continuously, periodically and/or upon a detected change of the tax rules and/or rates using information received from the various domains (e.g., states or jurisdictions) and/or systems associated with the various domains. For example, resource computation rates database 534 may be updated by using information received from the base domain 536, an Other Domain 1 538 and yet an Other Domain 2 540. Additional or fewer domains may exist and provide information to the resource computation rates database 534 in various embodiments. The resource computation rates database 534 may automatically receive such information by the base domain 536, Other Domain 1 538 and/or Other Domain 2 540 pushing such data as it is updated to the resource computation rates database 534 or by the resource computation rates database 534 periodically requesting such updated information from the base domain 536, Other Domain 1 538 and/or Other Domain 2 540. Or, such updates could be made manually.

The final result from the resource computation engine 530, such as the respective apportioned resource (e.g., the computed income tax amount) may then be electronically and automatically reported to each particular domain (e.g., state or jurisdiction) or to a system or entity associated with each respective domain for which the income tax was computed. For example, such information may include or be indicative of computed amounts of state income tax that was or will be withheld from the employee, credited to the employee, credited to each state, and/or remitted to each state, as well as credits for withholding or tax credits, such as the result from income withholdings or applying tax credit rules against the tax computation in order to prevent double taxation or credit in multiple states or jurisdictions. In some embodiments, the final result from the resource computation engine 530, such as the respective apportioned resource (e.g., the computed income tax) would first be reported to a payroll/equity system, such as a payroll/equity system of the employment information systems 514. The payroll/equity system of the employment information systems 514 would then process the income withholding and report the withholding to each respective domain (e.g., state or tax jurisdiction), as appropriate. In some embodiments, such reporting may be performed via the resource computation engine 530. In some embodiments, the resource computation engine 530 and/or employment information systems 514 may automatically: remit the computed income tax to each domain, electronically prepare and/or file tax returns with each applicable domain for the employer and/or employee, and/or electronically prepare tax forms, such as tax returns, for filing by the employer and/or employee with each applicable domain including income withholding and/or computed tax information.

Figure 6:
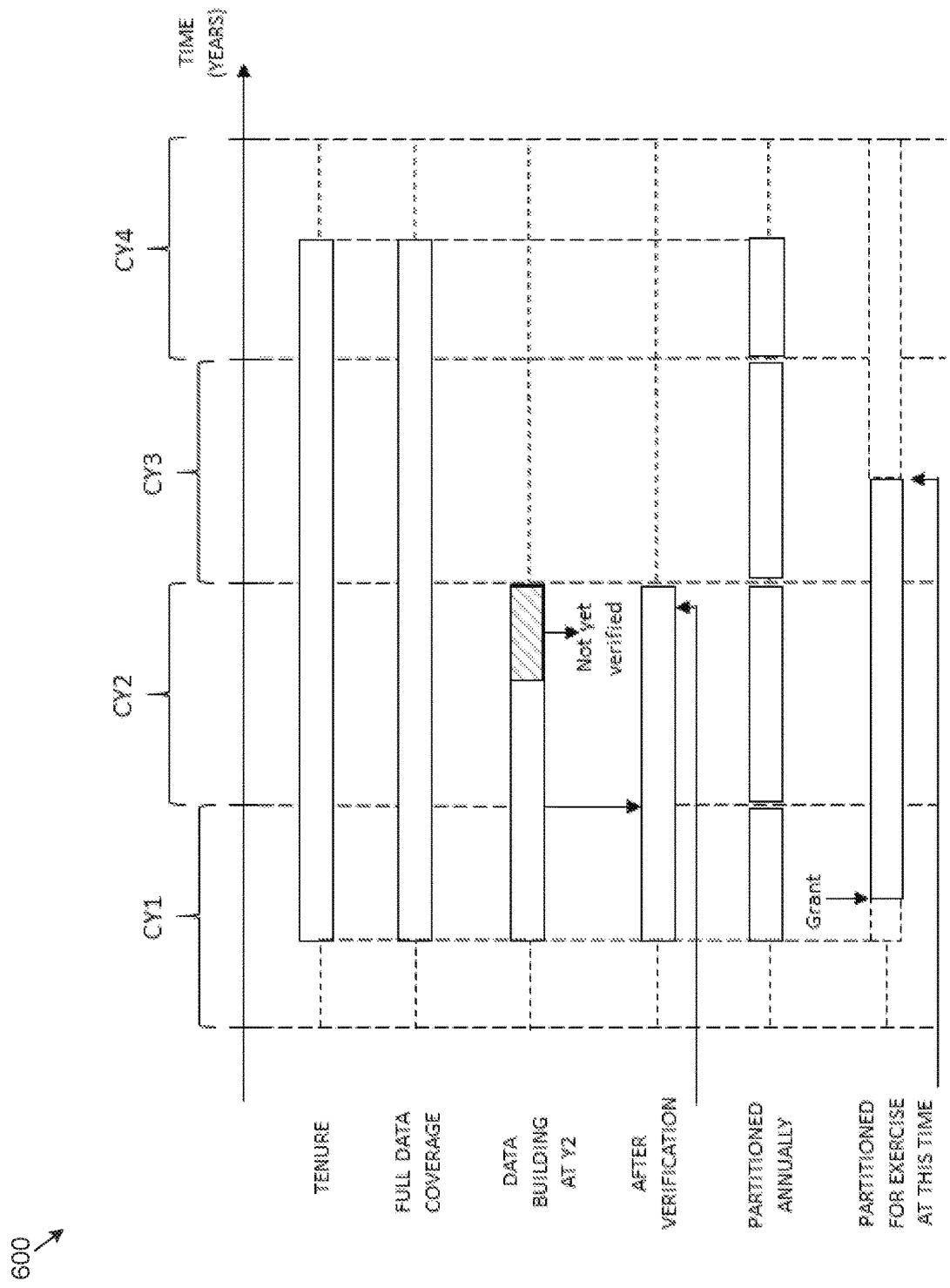
FIG. 6 is a timing diagram of an example of how employee time and benefits may be partitioned to improve the technology of software services, according to various embodiments of the present disclosure.

FIG. 6 is a timing diagram 600 of an example of how employee time and benefits may be partitioned by the mobile employee resource reporting and remitting service 310 of FIGS. 4 and 5 (which may include the domain allocation engine 520 of FIG. 5) to improve the technology of software services, according to various embodiments of the present disclosure.

Shown is a time axis that spans four Calendar Years, namely CY1, CY2, CY3 and CY4. Immediately below the time axis are timelines for a sample employee's sample tenure while working for a company, the time coverage of data generated according to embodiments described herein, sample building the data before and after employee verification or confirmation, partitioning the data annually, and segmenting the data according to when employee income was realized for properly apportioning to the correct tax jurisdiction (e.g., state or domain). In the present example, the employee's tenure begins some time during CY1 and ends some time in CY4. The employer obtains or receives data regarding the location of the employee for the full tenure of the employee, shown by the full data coverage line spanning the employee's entire tenure. In some embodiments, such data maybe collected as mentioned above, e.g. by the systems or devices of the employee 302, finance systems 304, IT systems 306 and/or HR systems 308 of the employer as shown in FIG. 4. The employer may verify some or all of such data, for example, by querying or prompting the employee to verify or confirm the accuracy or supplement such location information via the mobile application 402 and/or the desktop application 404 of FIG. 4. As shown in the timing diagram 600, the employer is building data at CY2, but some of the data has yet to be verified. After verification, the portion previously shown as not yet being verified is shown as now verified for CY2. As shown, the employer may partition cash compensation annually based on when the cash compensation was received or realized. Also shown is a grant of non-cash compensation (an equity award) in CY1 after the employee's tenure began which is then exercised or realized by the employee some time in CY3, and is thus partitioned over time according to when the equity award was exercised or realized. While FIG. 6 and the following FIG. 7 thus span a few years, it should be remembered that resolution, reporting, and remitting may take place at least annually, once for a previous year. Also, where a grant becomes vested in CY3, a revision may be generated in previous filings, such as CY1.

Figure 7:
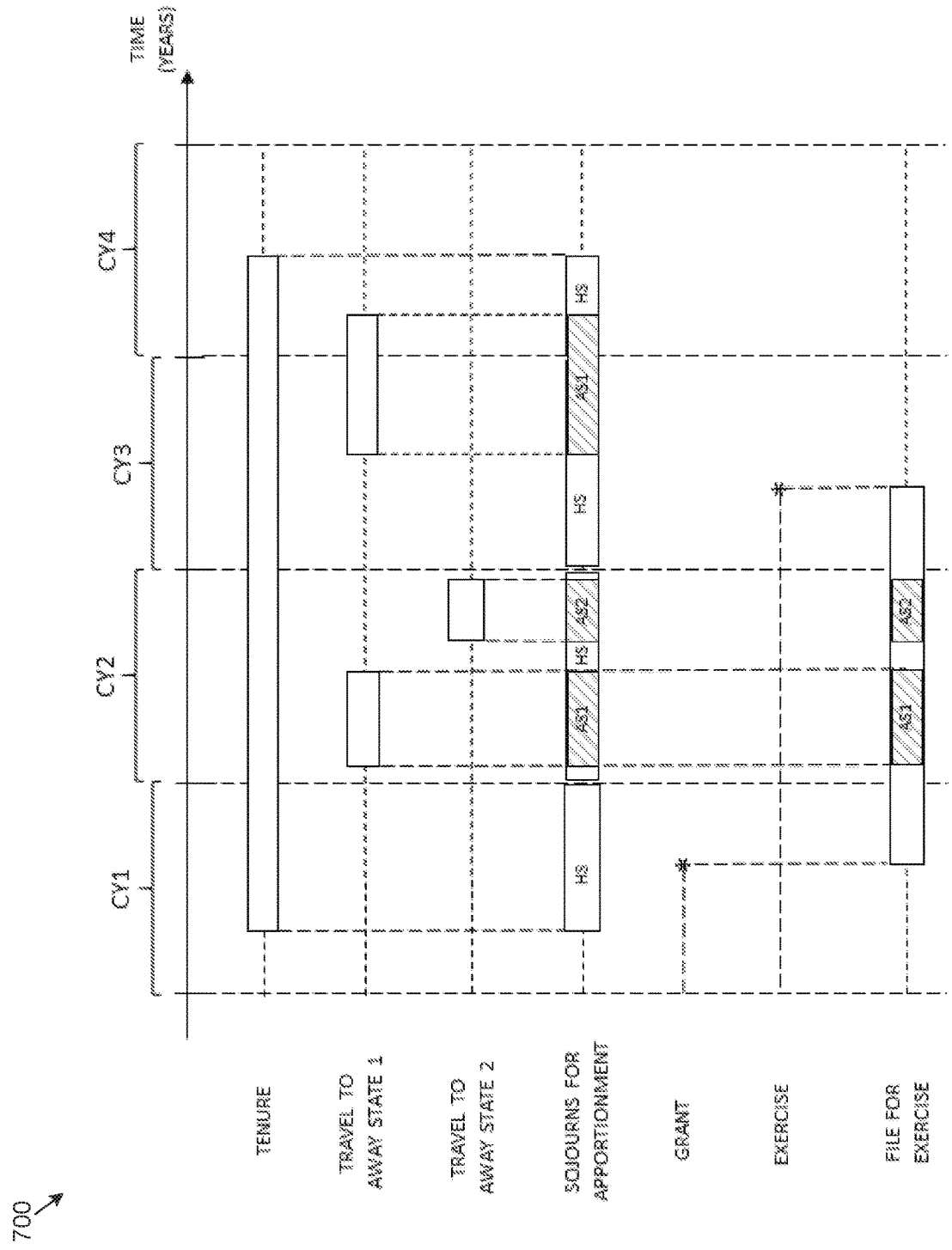
FIG. 7 is a timing diagram of an example of how employee time and benefits may be partitioned according to employee sojourns to improve the technology of software services, according to various embodiments of the present disclosure.

FIG. 7 is a timing diagram 700 of an example of how employee time and benefits may be partitioned by the mobile employee resource reporting and remitting service 310 of FIGS. 4 and 5 (which may include the domain allocation engine 520 of FIG. 5) according to employee stays ("sojourns") at various places to improve the technology of software services, according to various embodiments of the present disclosure. At the top, FIG. 7 repeats the time axis of FIG. 6, spanning the same four calendar years, and the employee's tenure timeline. Also, shown are segments of time in which the employee traveled away to different states. In the present example, shown are two segments of time in which the employee was located in Away State 1 (one starting and ending some time in CY2, and another starting in CY2 and ending in CY4). Also shown is a segment of time in CY2 in which the employee was located in Away State 2. For remaining segments of the employee's tenure, the data indicates the employee was located at the employee's home state ("HS"), which may be the state designated as the employee's home or residence for tax purposes, and can be also called the base domain. The timing diagram 700 shows segmenting the data for each CY according to segments of time when the employee traveled away to different states for properly apportioning cash income to the correct state. Shown is the annually segmented data coverage in which the segments labeled HS indicate the stays ("sojourns") in each jurisdiction, which will be the basis for apportioning the income among the states. The segments labeled as "AS1" indicate stays in Away State 1 and the segment labeled as "AS2" indicates a stay in Away State 2. Also shown is a grant of non-cash compensation (an equity award) in CY1 after the employee's tenure began, which is then exercised or realized by the employee some time in CY3, and is thus partitioned over time and reported accordingly on tax filings for CY3, and possibly previous years, based on when the equity award was exercised or realized in CY3. Additionally, the segment labeled as "AS1" indicates the income attributable to that segment is apportioned to Away State 1 for CY2 and the segment labeled as "AS2" indicates the income attributable to that segment is apportioned to Away State 2 for CY2. As shown, this apportionment corresponds to or is otherwise based on the different segments of time "AS1" and "AS2" indicating when and for how long the employee was located in Away State 1 and Away State 2 in CY2.

Figure 8:
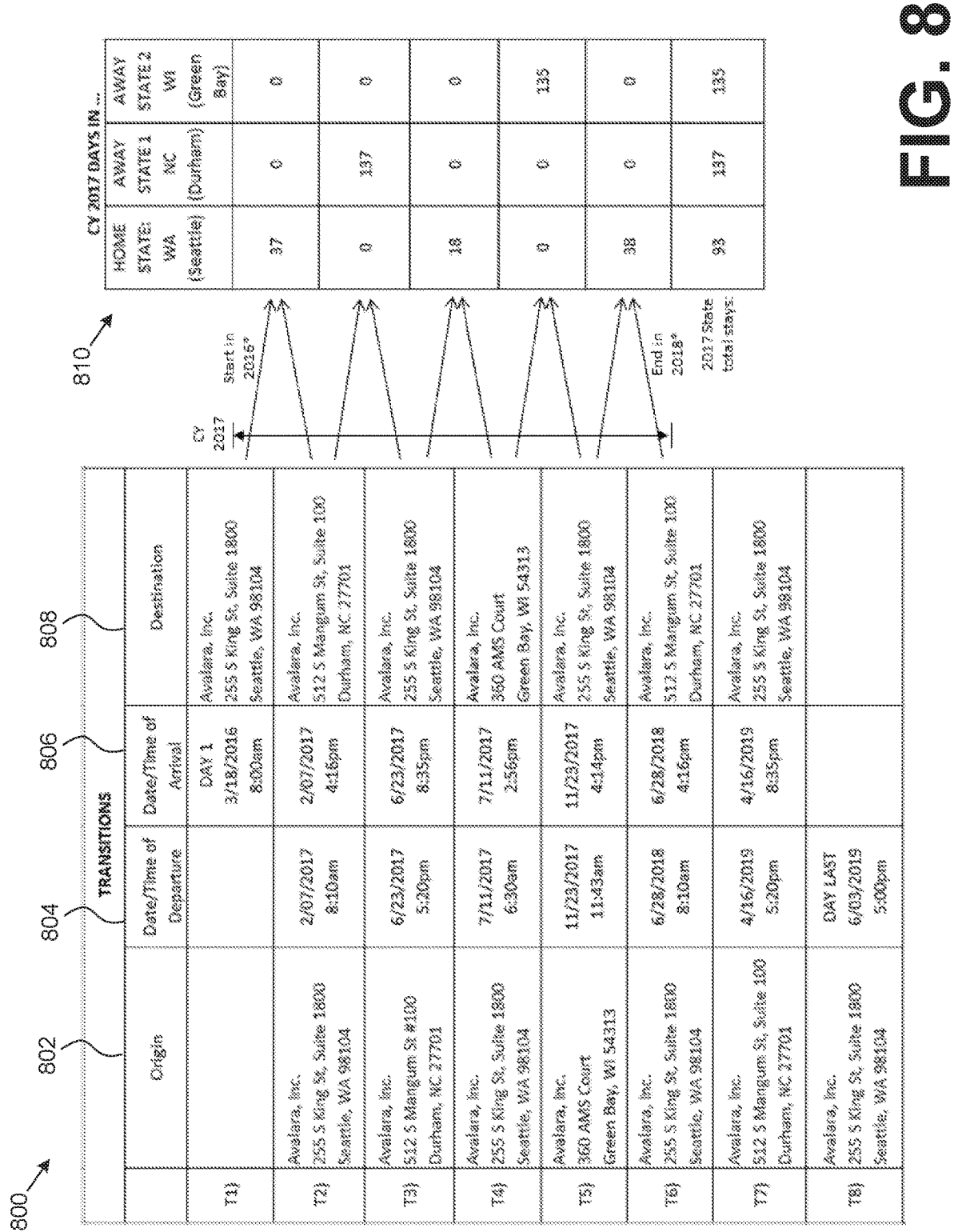
FIG. 8 is a chart indicating how data from employee physical transitions, such as travel or relocations, temporary or permanent, may be used to compute the length of stays, such as the sojourns of FIG. 7, in different jurisdictions, to improve the technology of software services, according to various embodiments of the present disclosure.

FIG. 8 is two charts 800 and 810 indicating how data from employee physical transitions, such as travel or relocations, temporary or permanent, may be used to compute the length of stays, such as the sojourns of FIG. 7, in different jurisdictions, to improve the technology of software services, according to various embodiments of the present disclosure.

Chart 800 is a way of organizing data for characterizing an employee's physical transitions, with columns 802, 804, 806, 808 and rows that describe trips. The employer may obtain or receive data regarding the travel and location of the employee over time shown in FIG. 8, including the origin 802, date/time of departure 804, date/time of arrival 806, destination 808 and other travel or location data. In some embodiments, such data may be determined and/or collected by the systems or devices of the employee 302, finance systems 304, IT systems 306 and/or HR systems 308 of the employer as shown in FIGS. 3 and 4 and described herein. For example, the expense reimbursement system 502 (which provides expense data 504) and employment information systems 514 of FIG. 5, including HRIS 510, HR systems 512 and others, may be integrated with, comprise, or be part of the finance systems 304, IT systems 306 and/or HR systems 308 and may be used to collect such data automatically and/or via data input by a user. The employer may verify some or all of such data, for example, by the mobile employee resource reporting and remitting service 310 querying or prompting the employee to verify the accuracy or supplement such location information via the mobile application 402 and/or the desktop application 404 of FIG. 4.

In an example embodiment, the data structure and content included in chart 800 may be used by the employee time-locator engine 516 to generate the tentative timeline of the employee's location of FIG. 5. Shown is the data organized into a plurality of trips (T1, T2, T3, T4, T5, T6, T7 and T8), with one trip per row, taken by the employee to various locations. This data is, of course, fictitious. In the present example, these trips cover an entire hypothetical tenure of a sample employee of Avalara, Inc. It will be observed that both the origins and the destinations in chart 800 are offices of Avalara at the time of this filing, but in different states. Their first day is conveniently indicated by a half-trip T1 having a date and time of arrival and destination as the employee's designated home state of Washington. Subsequent trips T2-T7 include trips to and from an away state (a state other than the designated home state of Washington). Each of trips T2-T2 include an origin at column 802, date/time of departure at column 804, date/time of arrival at column 806 and destination at column 808. Their last day is conveniently indicated as a half-trip T8. Each sojourn is segment is determined from the Date/Time of Arrival of column 806 of one trip until the Date/Time of Departure in column 804 of the next trip in the next row. It will be recognized that care has been taken to craft the example of chart 800 so that it yields the sample sojourns of FIG. 7, with CY1 being the year 2016.

Based on the data regarding the travel and location of the employee over time shown in chart 800 that is determined and/or collected by one or more of the systems or devices of the employee 302, finance systems 304, IT systems 306 and/or HR systems 308 of the employer, the mobile employee resource reporting and remitting service 310 may apportion respective amounts of time to the home state (e.g., Washington) and each away state (e.g., North Carolina and Wisconsin) based on computing the number of days spent in the home state as well as the number of days spent in each away state. The total number of days spent in the home state as well as the number of days spent in each away state may be computed over a particular time period, such as a particular calendar year or tax year. An example of such computations for the timeline shown in chart 800 is shown in chart 810. In particular, chart 810 has columns for each state, and uses the trips of chart 800 to determine days of each sojourn. The totals of these individual days may be computed for apportioning to a time period such as a calendar year. For example, chart 810 then adds the total days for each state for a single sample CY. In this example, chart 810 therefore shows that, for the sample CY 2017, the employee stayed a total number of 93 days in the home state (Washington), a total number of 137 days in Away State 1 (North Carolina). and a total number of 135 days in Away State 2 (Wisconsin).

Based on these computations above, the mobile employee resource reporting and remitting service 310 (e.g., the resource computation engine 530 of FIG. 5) may then compute for the employee an income tax amount, tax credits and/or corresponding income withholdings (which may be applied to a current year and/or future years' earnings) for the home state of Washington and each away state, including North Carolina and Wisconsin. In various embodiments, some trips or transitions may not be tracked, or computations may not be made for such trips, if such trips are not relevant for tax purposes, for example trips for vacation. In some embodiments, the resource computation engine 530 of FIG. 5 computes the income tax, tax credits and/or corresponding income withholdings for each away state proportionally to each other and/or the total days in CY 2017 based on the respective total number of days spent in each away state in CY 2017 (as shown in chart 810) according to various different tax rates and rules for each state. In some embodiments, although based on the respective total number of days spent in each away state, the computed income tax, tax credits and/or corresponding income withholdings may not be proportional to each other or the total days in CY 2017, but are based on or adjusted according to various different tax rates and rules for each state. To continue the above example, if the employee's annual salary for CY 2017 was $48,000 and assuming no special rules then, for that year, the apportionment to the Home State (Washington) would be $48,000×93/365=$12,230.14, the apportionment to the Away State 1 (North Carolina) would be $48,000× 137/365=$18,016.44, and the apportionment to the Away State 2 (Wisconsin) would be $48,000×135/365=$17, 753.42. These would the employee income amounts for which respective resources would be computed, such as income tax amounts.

In some embodiments, the data structure and content included in chart 810 may comprise, include, be integrated with or be part of the tentative timeline of the employee's location generated by the employee time-locator engine 516 and be included in the corresponding employee time-location data 518. In other embodiments, the data structure and content included in chart 810 may be generated by the domain allocation engine 520 of FIG. 5 and may comprise, include, be integrated with or be part of the employee time-domain file 524 used by resource computation engine 530 of FIG. 5.

Figure 9:
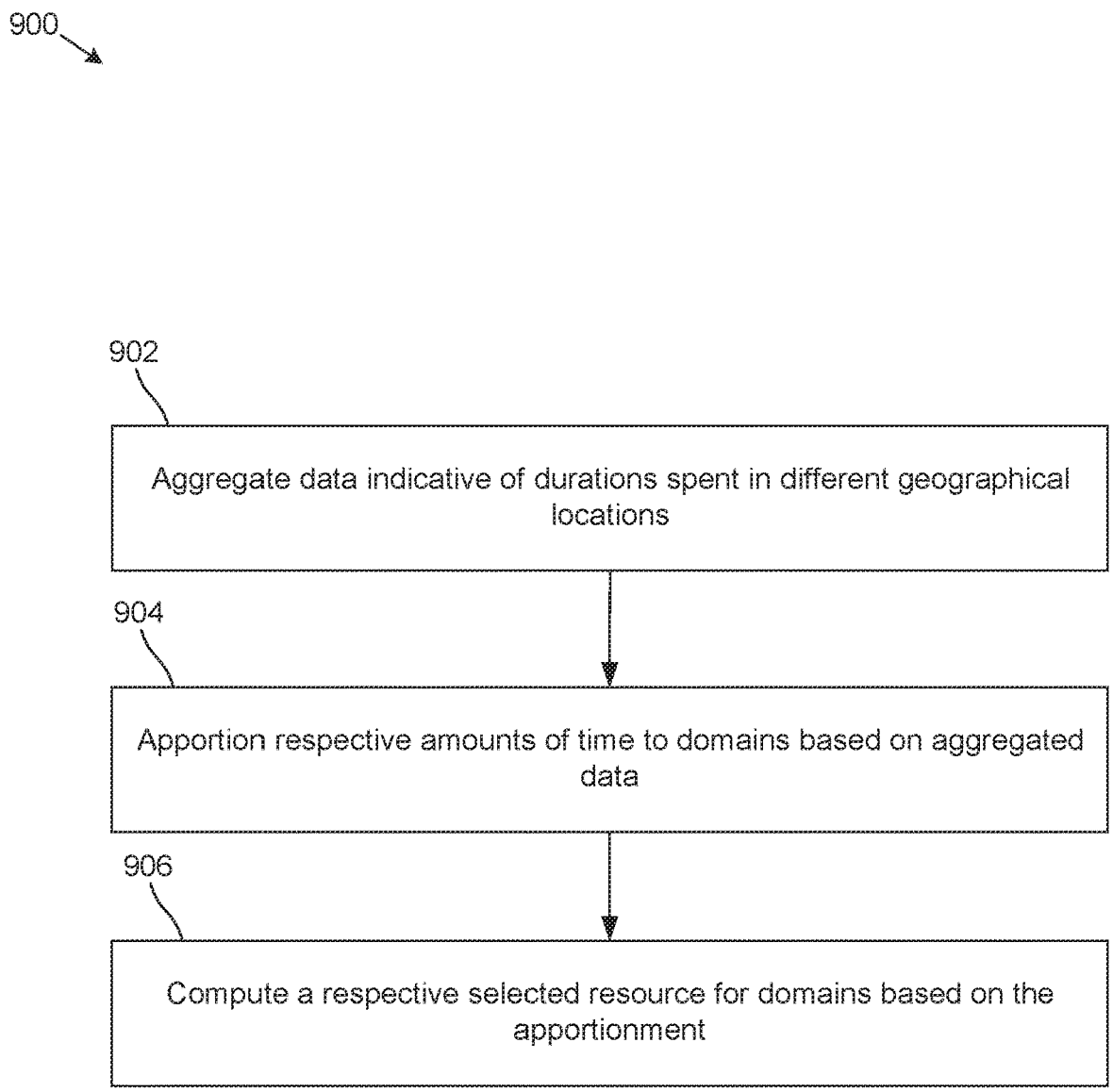
FIG. 9 is a flow diagram of a method for selected resource computation for mobile employees that improves the technology of software services, according to various embodiments of the present disclosure.

FIG. 9 is a flow diagram of a method 900 for selected resource computation for mobile employees that improves the technology of software services, according to various embodiments of the present disclosure.

At 902, the system aggregates data indicative of different geographical locations and durations spent in the geographical locations by at least one employee over a time period.

At 904, the system apportions respective amounts of time to each domain of a plurality of domains based on the aggregated data indicative of different geographical locations and durations spent in the geographical locations by the at least one employee over the time period.

At 906, the system 100 computes, for the at least one employee, a respective selected resource for one or more domains of the plurality of domains based on the respective amounts of time apportioned to each domain of the plurality of domains.

Figure 10:
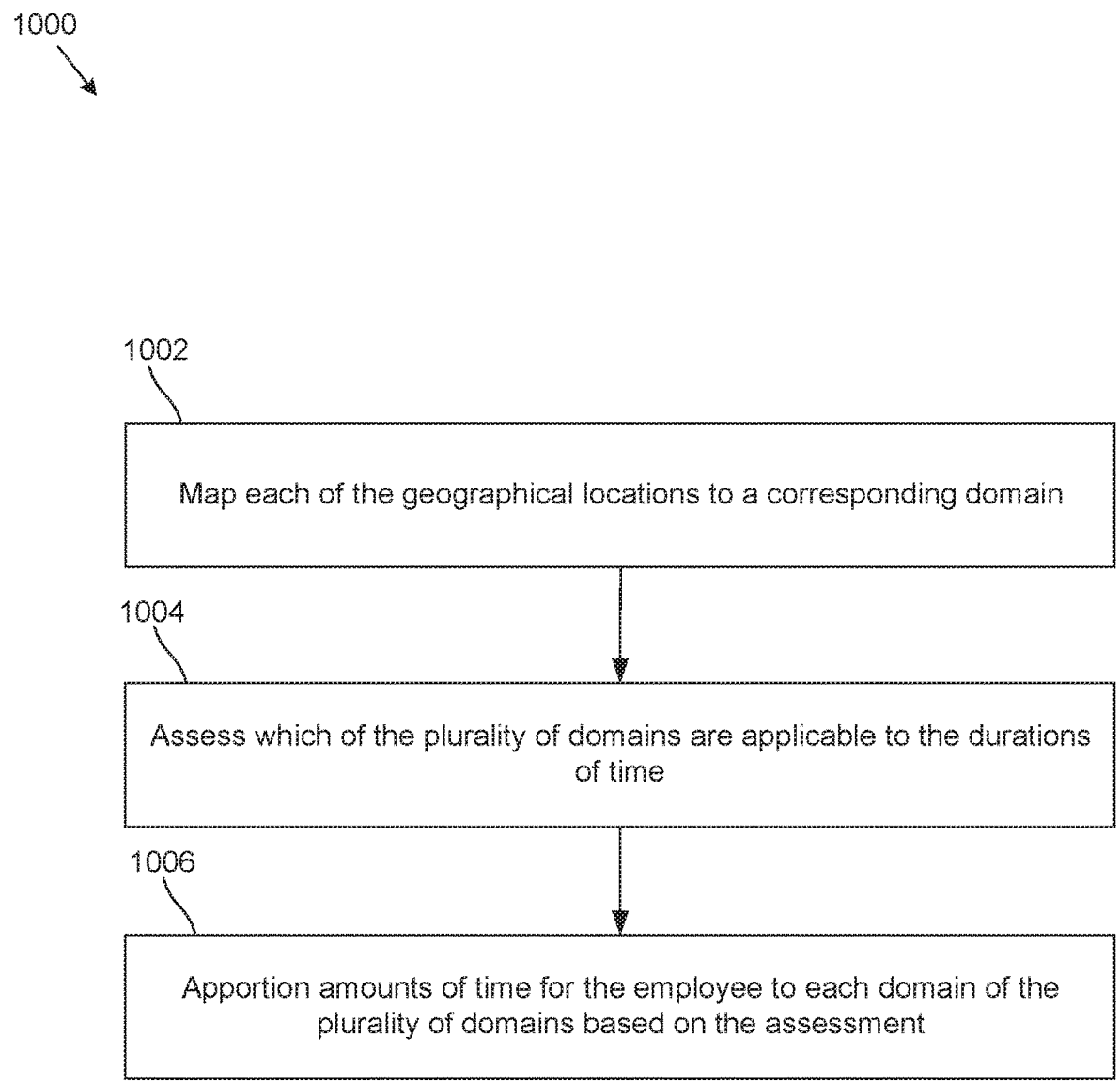
FIG. 10 is a flow diagram of a method for apportioning amounts of time for the employee that improves the technology of software services and is useful in the method of FIG. 9, according to various embodiments of the present disclosure.

FIG. 10 is a flow diagram of a method 1000 for apportioning amounts of time for the employee that improves the technology of software services and is useful in the method 900 of FIG. 9, according to various embodiments of the present disclosure.

At 1002, the system maps each of the geographical locations to a corresponding domain of the plurality of domains. Prior to the mapping, the system 100 may generate a timeline of geographical locations of the at least one employee over the time period based on the aggregated data. The apportioning of the respective amounts of time to each domain of the plurality of domains may be based on this generated timeline. The timeline may include durations of time the employee spent in each of the geographical locations. The domains may be states, and so on.

At 1004, the system 100 assesses which of the plurality of domains are applicable to the durations of time the at least one employee spent in each of the geographical locations over the time period based on the mapping of each of the geographical locations to a corresponding domain of the plurality of domains.

At 1006, the system 100 apportions respective amounts of time for the at least one employee to each domain of the plurality of domains based on the assessment of which of the plurality of domains are applicable to the durations of time the at least one employee spent in each of the geographical locations over the time period.

Figure 11:
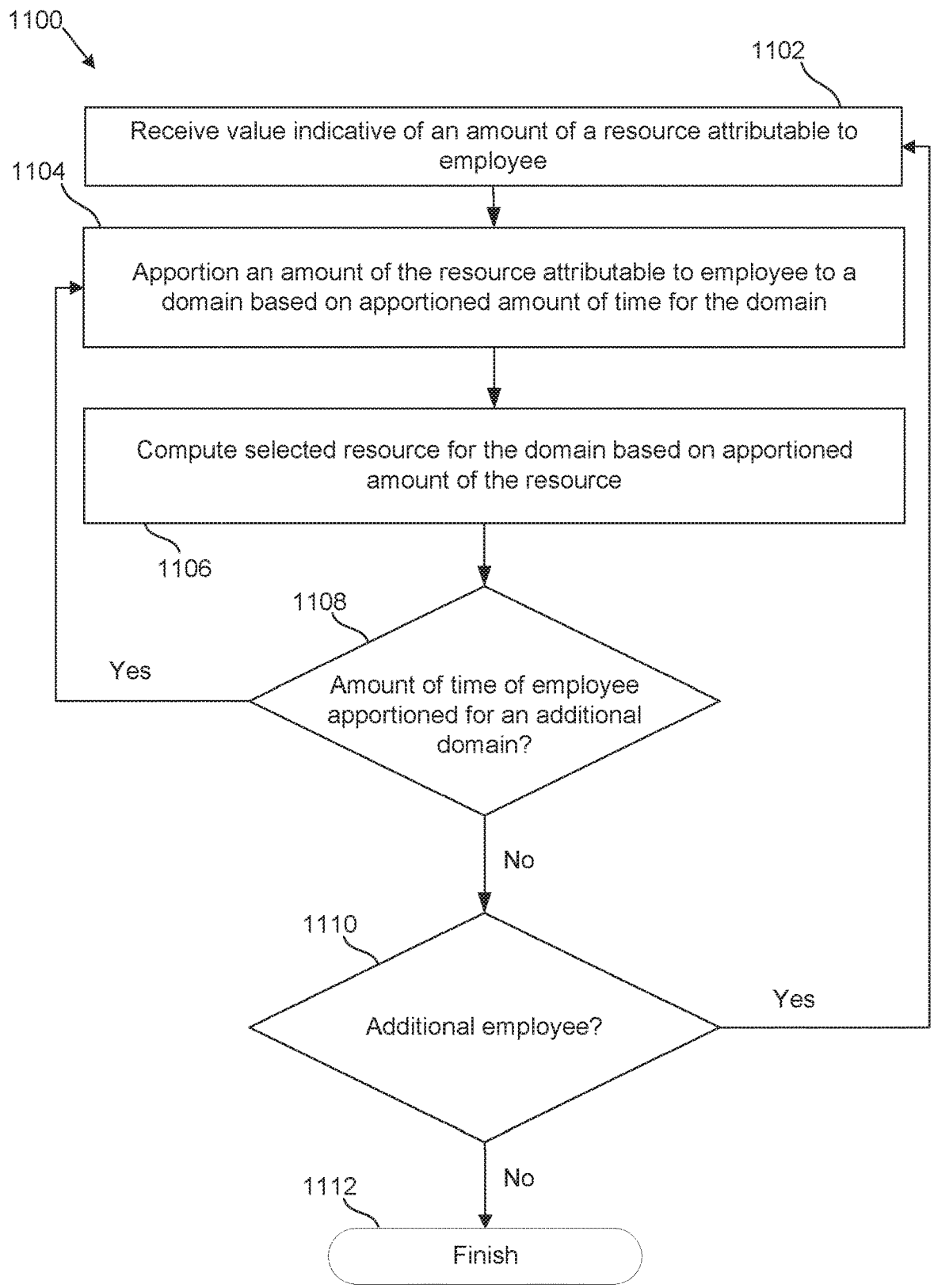
FIG. 11 is a flow diagram of a method for selected resource computation for a plurality of domains for each of a plurality of employees based on an apportioned amount of resource attributable to each domain that improves the technology of software services and is useful in the method of FIG. 9 and FIG. 10, according to various embodiments of the present disclosure.

FIG. 11 is a flow diagram of a method 1100 for selected resource computation for a plurality of domains for each of a plurality of employees based on an apportioned amount of a resource attributable to each domain, that improves the technology of software services and is useful in the method 900 of FIG. 9 and the method 1000 of FIG. 10, according to various embodiments of the present disclosure.

At 1102, the system 100 receives a value indicative of an amount of a resource attributable to the employee that is subject to the computation of the respective selected resource.

At 1104, the system 100 apportions a respective amount of the resource attributable to the employee to each domain of the plurality of domains. This can be based on the respective amounts of time for the employee apportioned to each domain of the plurality of domains.

At 1106, the system 100 computes the respective selected resource for one or more domains of the plurality of domains based on the respective apportioned amount of the resource attributable to the employee to each domain of the plurality of domains.

At 1108, the system 100 determines whether there is an amount of time of the employee apportioned for an additional domain. For example, this may be based on the respective amounts of time for the employee apportioned to multiple different domains of the plurality of domains. In response to the system 100 determining there is an amount of time of the employee apportioned for an additional domain, the method 1100 proceeds to 1104 to apportion a respective amount of the resource attributable to the employee for that additional domain. In response to the system 100 determining there is not an amount of time of the employee apportioned for an additional domain, the method 1100 proceeds to 1110.

At 1110 the system 100 determines whether there is an additional employee for which to compute a selected resource. In response to the system 100 determining there is an additional employee for which to compute a selected resource, the method 1100 proceeds to 1102 and receives a value indicative of an amount of a resource attributable to the additional employee that is subject to the computation of the respective selected resource. In response to the system 100 determining there is not an additional employee for which to compute a selected resource, the method 1100 proceeds to 1112 where the method finishes. The system 100, may electronically communicate, for each domain of the plurality of domains, the respective apportioned amount of the resource attributable to the employee to an entity associated with the domain. The system 100 may electronically withhold, for the one or more domains, an amount of a resource for the employee based on the computed respective selected resource for the domain.

In some embodiments, the system 100 may, for each domain of the one or more domains, use a rate specific to the domain to compute the respective selected resource for the domain. For example, before computing the respective selected resource for the one or more domains, for each domain of the one or more domains, the system 100 may look up (e.g., in resource computation rates database 534 of FIG. 5) stored rules regarding computing selected resources for the domain and determine the rate specific to the domain based on the looked-up stored rules.

Figure 12:
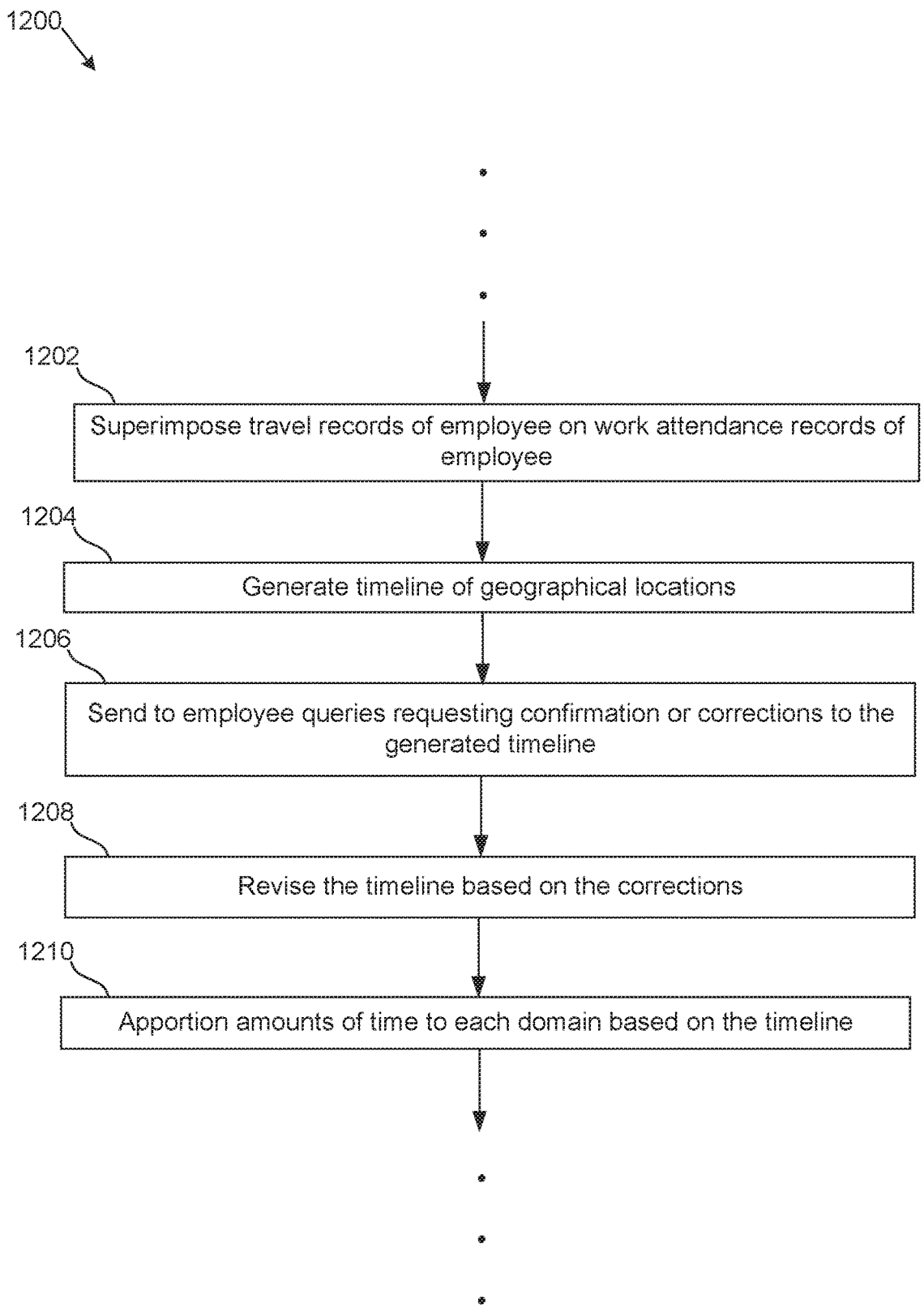
FIG. 12 is a flow diagram of a method for generating a timeline of geographical locations that improves the technology of software services and is useful in the method of FIG. 9, according to various embodiments of the present disclosure.

FIG. 12 is a flow diagram of a method 1200 for generating a timeline of geographical locations that improves the technology of software services and is useful in the method 900 of FIG. 9, according to various embodiments of the present disclosure. For example, in some embodiments, the method 900 may further include one or more of the actions of method 1200.

At 1202, the system 100 superimposes travel records of the at least one employee on work attendance records of the at least one employee.

At 1204, the system 100 generates a timeline of geographical locations of the at least one employee over the time period based on the aggregated data. This may be performed by the superimposing of the travel records of the at least one employee on work attendance records of the at least one employee.

At 1206, the system 100 sends one or more queries requesting confirmation or corrections to the generated timeline. The one or more queries may be sent to the at least one employee.

At 1208, the system 100 revises the timeline based on the one or more corrections. For example, the one or more corrections may be received from the at least one employee in response to the one or more queries.

At 1210, the system 100 apportions respective amounts of time to each domain of the plurality of domains based on the generated timeline.

Additional Details

Additional details about FIG. 1 and FIG. 2 are now provided. Computer 112 further includes a video adapter 211, which is also coupled to system bus 232. Video adapter 211 may be able to drive and/or support a screen 221 that is used by user 192 together with computer 112.

In addition to screen 221, other peripheral input/output (I/O) devices that may be used together with computer 112 include a keyboard 222, a mouse 223, a media tray 224 and a printer 225. Media tray 224 may include storage devices such as CD-ROM drives, multi-media interfaces, and so on. Computer 112 moreover includes an I/O interface 228 connected to these peripheral I/O devices as shown, for the purpose of communicating with them. In this example, these connections are direct. Alternately, one or more of these connections may take place via universal serial bus (USB) ports 229 of computer 112, to which I/O interface 228 is also connected.

Computer 112 moreover includes a bus bridge 216 coupled to system bus 232, and an input/output (I/O) bus 236. I/O bus 236 is coupled to bus bridge 216 and to I/O interface 228.

Computer 112 also includes various memory components. A non-volatile memory component is a hard drive 244. Computer 112 further includes a hard drive interface 242 that is coupled to hard drive 244 and system bus 232.

Additional memory components are in a system memory 248, which is also coupled to system bus 232. System memory includes volatile memory including, but not limited to, cache memory, registers and buffers. In embodiments, data from hard drive 244 populates registers of the volatile memory of system memory 248.

Sample system memory 248 has a software architecture that uses a stack of layers, with each layer providing a particular functionality. In this example the layers include—starting from the bottom—an operating system (OS) 250, libraries 260, frameworks/middleware 270 and application programs 280. Other software architectures may include less, more or different layers. For example, a presentation layer may also be included. For another example, some mobile or special purpose operating systems may not provide a frameworks/middleware 270.

OS 250 may manage hardware resources and provide common services. Libraries 260 provide a common infrastructure that is used by applications 280 and/or other components and/or layers. Libraries 260 provide functionality that allows other software components to perform tasks in a more easy fashion than to interface directly with the specific underlying functionality of OS 250. Libraries 260 may include system libraries 261, such as a C standard library. System libraries 261 may provide functions such as memory allocation functions, string manipulation functions, mathematical functions, and the like.

In addition, libraries 260 may include API libraries 262 and other libraries 263. API libraries 262 may include media libraries, such as libraries to support presentation and manipulation of various media formats such as MPREG4, H.264, MP3, AAC, AMR, JPG, and PNG. API libraries 262 may also include graphics libraries, for instance, an OpenGL framework that may be used to render 2D and 3D in a graphic content on screen 221. API libraries 262 may further include database libraries, for instance, SQLite, which may support various relational database functions. API libraries 262 may additionally include web libraries, for instance, WebKit, which may support web browsing functionality.

Frameworks/middleware 270 may provide a higher-level common infrastructure that may be used by applications 280 and/or other software components/modules. For example, frameworks/middleware 270 may provide various graphic user interface (GUI) functions, high-level resource management, high-level location services, and so forth. Frameworks/middleware 270 may provide a broad spectrum of other APIs that may be used by applications 280 and/or other software components/modules, some of which may be specific to OS 250 or to a platform.

Application programs 280 are also known more simply as applications and apps. One such app is a browser 281. Browser 281 is an example of a renderer, which includes program modules and instructions that enable computer 112 to exchange network messages with network 194 using hypertext transfer protocol (HTTP) messaging.

Other such applications 280 may include a contacts application, a time management application, an ERP application, a book reader application, a location application, a media application, a messaging application, and so on. Applications 280 may be developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. Applications 280 may use built-in functions of OS 250, libraries 260, and frameworks/middleware 270 to create user interfaces for user 192 to interact with.

The hardware elements depicted in computer 112 are not intended to be exhaustive. Rather, they are representative, for highlighting essential components that can be used with embodiments.

Instructions for performing any of the methods or functions described herein may be stored, completely or partially, within the memory components of server computer 141, computer 112, etc. These memory components include the indicated memory components, plus cache memory within the processors such as processor 214. Accordingly, these memory components are examples of machine-readable media.

In this context, "machine-readable medium" or "computer-readable medium" refers to a component, device or other tangible media able to store instructions and data temporarily or permanently and may include, but is not limited to, a thumb drive, a hard disk, random-access memory (RAM), read-only memory (ROM), buffer memory, flash memory, optical media, magnetic media, cache memory, an Erasable Programmable Read-Only Memory (EPROM), an optical fiber, a portable compact disc read-only memory (CD-ROM), an optical storage device, a magnetic storage device, solid state memory device, or any suitable combination of the foregoing.

The term "machine-readable medium" or "computer-readable medium" should be taken to include a single medium or multiple media (e.g., a centralized or distributed database, or associated caches and servers) able to store instructions that a machine such as a processor can store, erase, or read. The term "machine-readable medium" or "computer-readable medium" shall also be taken to include any medium, or combination of multiple media, that is capable of storing instructions (e.g., code) for execution by a machine, such that the instructions, when executed by one or more processors of the machine, cause the machine to perform any one or more of the methods or functions or processes described herein. Accordingly, instructions transform a general, non-programmed machine into a particular machine programmed to carry out the described and illustrated functions in the manner described.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Processor 214, as well as the processor of server computer 141, is a physical circuit that manipulates physical quantities representing data values. The manipulation can be according to control signals, which can be known as commands, op codes, machine code, etc. The manipulation can produce corresponding output signals that are applied to operate a machine. As such, a processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), a Field-Programmable Gate Array (FPGA), an Application Specific Integrated Circuit (ASIC), any combination of these, and so on. A processor may further be a multi-core processor having two or more independent processors that execute instructions. Such independent processors are sometimes called "cores."

A hardware component such as a processor may also include programmable logic or circuitry that is temporarily configured by software to perform certain operations. For example, a hardware component may include software executed by a general-purpose processor or other programmable processor. Once configured by such software, hardware components become specific machines, or specific components of a machine, uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations.

As used herein, a "component" may refer to a device, physical entity or logic having boundaries defined by function or subroutine calls, branch points, application programming interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components.

Where a phrase similar to "at least one of A, B, or C," "at least one of A, B, and C," "one or more A, B, or C," or "one or more of A, B, and C" is used, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

In the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The claimed invention is:

1. A method, including:
   aggregating, by a computer system, data indicative of different geographical locations and durations spent in the geographical locations by at least one employee over a time period;
   apportioning, by the computer system, respective amounts of time to each domain of a plurality of domains based on the aggregated data indicative of different previous geographical locations and durations previously spent in the geographical locations by the at least one employee over the time period;
   computing, by the computer system, for the at least one employee, a respective selected resource for one or more domains of the plurality of domains based on the respective amounts of time apportioned to each domain of the plurality of domains; and
   generating, by the computer system, a timeline of previous geographical locations of the at least one employee over the time period based on the aggregated data, and in which the apportioning respective amounts of time to each domain of a plurality of domains is based on the generated timeline;
   in which;
   the computing system comprises a mobile employee resource reporting and remitting service;
   the timeline is generated by superimposing travel records of the last at least one employee on work attendance records of the at least one employee;
   apportioning, by the computer system, the respective amounts of time comprises concatenating a first number of days spent at a specific location during a first trip with a second number of days spent at the same specific location during a second trip; and
   aggregating by the computer system, the data indicative of different geographical locations and durations spent in the geographical locations comprises requesting or automatically receiving the data from at least three of an accounting application, a human resource application, a finance application, an information technology application, or an ecommerce application.

2. The method of claim 1, in which:
   the aggregating the data includes aggregating data indicative of different geographical locations and durations spent in the geographical locations by a plurality of employees over a time period;
   the apportioning respective amounts of time includes apportioning respective amounts of time to each domain of the plurality of domains based on the aggregated data indicative of different geographical locations and durations spent in the geographical locations by the plurality of employees over the time period; and the computing the respective selected resource includes computing, for each employee of the plurality of employees, a respective selected resource for multiple domains of the plurality of domains based on the respective amounts of time apportioned to each domain of the plurality of domains.

3. The method of claim 1, further including:

receiving, by the computer system, one or more corrections to the generated timeline of locations of the at least one employee; and revising, by the computer system, the timeline based on the one or more corrections, and in which the computing the respective selected resource is based on the revised timeline.

4. The method of claim 3, in which:

the one or more corrections are received from the at least one employee.

5. The method of claim 3, further including:

sending, by the computer system, one or more queries requesting confirmation or corrections to the generated timeline; and in which the one or more corrections are received in response to the one or more queries.

6. The method of claim 5, in which:

the one or more queries are sent to the at least one employee.

7. The method of claim 1, in which the timeline includes durations of time the at least one employee spent in each of the geographical locations and the apportioning respective amounts of time to each domain of a plurality of domains includes:

mapping each of the geographical locations to a corresponding domain of the plurality of domains;

assessing which of the plurality of domains are applicable to the durations of time the at least one employee spent in each of the geographical locations over the time period based on the mapping of each of the geographical locations to a corresponding domain of the plurality of domains; and apportioning respective amounts of time for the at least one employee to each domain of the plurality of domains based on the assessment of which of the plurality of domains are applicable to the durations of time the at least one employee spent in each of the geographical locations over the time period.

8. The method of claim 7, in which the computing, for the at least one employee, the respective selected resource includes:

receiving a value indicative of an amount of a resource attributable to the at least one employee that is subject to the computation of the respective selected resource;

apportioning a respective amount of the resource attributable to the at least one employee to each domain of the plurality of domains based on the respective amounts of time for the at least one employee apportioned to each domain of the plurality of domains; and computing the respective selected resource for one or more domains of the plurality of domains based on the respective apportioned amount of the resource attributable to the at least one employee to each domain of the plurality of domains.

9. The method of claim 8, further including:

electronically communicating, by the computer system, for each domain of the plurality of domains, the respective apportioned amount of the resource attributable to the at least one employee to an entity associated with the domain.

10. The method of claim 8, further including:

electronically withholding, by the computer system, for each domain of the one or more domains, an amount of a resource for the at least one employee based on the computed respective selected resource for the domain.

11. The method of claim 1, in which the computing the respective selected resource for one or more domains of the plurality of domains includes, for each domain of the one or more domains of the plurality of domains, using a rate specific to the domain to compute the respective selected resource for the domain.

12. The method of claim 11, further including:

before computing the respective selected resource for the one or more domains of the plurality of domains, for each domain of the one or more domains of the plurality of domains:

looking up, by the computer system, stored rules regarding computing selected resources for the domain; and determining, by the computer system, the rate specific to the domain based on the looked-up stored rules.

\* \* \* \* \*